(12) United States Patent
Yamamoto et al.

(10) Patent No.: US 12,067,761 B2
(45) Date of Patent: Aug. 20, 2024

(54) INFORMATION PROCESSING DEVICE, INFORMATION PROCESSING METHOD, AND PROGRAM

(71) Applicant: Sony Group Corporation, Tokyo (JP)

(72) Inventors: Yuki Yamamoto, Chiba (JP); Yusuke Hieida, Chiba (JP); Suguru Aoki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 12 days.

(21) Appl. No.: 17/631,424

(22) PCT Filed: Jul. 22, 2020

(86) PCT No.: PCT/JP2020/028389
§ 371 (c)(1),
(2) Date: Jan. 28, 2022

(87) PCT Pub. No.: WO2021/024805
PCT Pub. Date: Feb. 11, 2021

(65) Prior Publication Data
US 2022/0277556 A1    Sep. 1, 2022

(30) Foreign Application Priority Data
Aug. 6, 2019   (JP) ................. 2019-144401

(51) Int. Cl.
*G06V 10/80*    (2022.01)
*B60R 1/27*    (2022.01)
(Continued)

(52) U.S. Cl.
CPC .............. *G06V 10/806* (2022.01); *B60R 1/27* (2022.01); *G06V 10/82* (2022.01); *G06V 20/56* (2022.01)

(58) Field of Classification Search
CPC ...... G06V 10/806; G06V 10/82; G06V 20/56; G06V 20/58; B60R 1/00; G06T 7/00; G08G 1/09; G08G 1/16
See application file for complete search history.

(56) References Cited

U.S. PATENT DOCUMENTS 11,062,454 B1 *   7/2021   Cohen .................... G01S 7/417
2019/0014301 A1 *  1/2019   Ota ......................... G06T 7/564
(Continued)

FOREIGN PATENT DOCUMENTS

| CN | 110032962 A | 7/2019 |
| JP | 2014-160419 | * 9/2014 |

(Continued)

OTHER PUBLICATIONS

International Search Report and English translation thereof mailed Oct. 6, 2020 in connection with International Application No. PCT/JP2020/028389.

*Primary Examiner* — Md K Talukder
(74) *Attorney, Agent, or Firm* — Wolf, Greenfield & Sacks, P.C.

(57) ABSTRACT

The present disclosure relates to an information processing device, an information processing method, and a program for improving object recognition accuracy.
A feature amount calculation unit of a user's car calculates a feature amount for an object recognition result in stages in each of a plurality of hierarchies, an acquisition unit acquires a feature amount for an object recognition result calculated by a feature amount calculation unit of another car, and a recognition unit performs the object recognition on the basis of the feature amount calculated by the user's car and the acquired feature amount calculated by the another car. The present disclosure can be applied to a mobile body.

14 Claims, 11 Drawing Sheets

(51) Int. Cl.
  *G06V 10/82* (2022.01)
  *G06V 20/56* (2022.01)

(56) References Cited

U.S. PATENT DOCUMENTS

| | | |
|---|---|---|
| 2019/0096086 A1 | 3/2019 | Xu et al. |
| 2019/0147245 A1* | 5/2019 | Qi .......................... G06V 10/82 |
| | | 382/103 |
| 2019/0220029 A1* | 7/2019 | Fukuhara ............ G06F 18/2185 |
| 2020/0012868 A1* | 1/2020 | Hong ................. G06V 20/56 |
| 2020/0242402 A1* | 7/2020 | Jung .................... G06F 18/214 |
| 2020/0394460 A1* | 12/2020 | Shiraishi ............... G06V 10/772 |
| 2021/0334564 A1* | 10/2021 | Park ........................ G06V 20/59 |
| 2022/0032955 A1* | 2/2022 | Xiang ................... G06V 20/58 |
| 2022/0277556 A1* | 9/2022 | Yamamoto ............. G06V 10/82 |

FOREIGN PATENT DOCUMENTS

| | | |
|---|---|---|
| JP | 2014-160419 A | 9/2014 |
| JP | 2017-215272 A | 12/2017 |
| JP | 2019-016161 A | 1/2019 |

\* cited by examiner

INFORMATION PROCESSING DEVICE, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/028389, filed in the Japanese Patent Office as a Receiving Office on Jul. 22, 2020, which claims priority to Japanese Patent Application Number JP2019-144401, filed in the Japanese Patent Office on Aug. 6, 2019, each of which is hereby incorporated by reference in its entirety.

TECHNICAL FIELD

The present disclosure relates to an information processing device, an information processing method, and a program, and more particularly to an information processing device, an information processing method, and a program for improving object recognition accuracy.

BACKGROUND ART

A technique of sensing surroundings of a vehicle by cameras and various sensors such as light detection and ranging or laser imaging detection and ranging (LiDAR) mounted on the vehicle, and recognizing an object around the vehicle on the basis of sensing results has been proposed.

However, with only the sensing results of the sensors mounted on the vehicle that a user is on board, only the sensing result of a hidden object and the sensing result from a direction in which the object is difficult to recognize are obtained depending on a positional relationship with other vehicles, which causes degradation in object recognition accuracy.

Therefore, it is conceivable to apply a technique for improving processing accuracy for a specific object by processing an image captured for use in processing for another object as well (see Patent Document 1).

CITATION LIST

Patent Document

Patent Document 1: Japanese Patent Application Laid-Open No. 2019-016161

SUMMARY OF THE INVENTION

Problems to be Solved by the Invention

However, even in the case of applying the technique according to Patent Document 1 and using the sensing results obtained by sensing other vehicles, there is a possibility that recognition results contradict each other due to different sensors.

Furthermore, even in the case of using the sensing results obtained by sensing other vehicles, only the recognition accuracy in a common observation area can be improved, and there is a possibility that the recognition accuracy cannot be improved as a whole.

The present disclosure has been made in view of such a situation, and in particular improves object recognition accuracy by acquiring feature amounts obtained from sensing results of other vehicles, selecting and combining the feature amounts, and collectively using the feature amounts for object recognition.

Solutions to Problems

An information processing device and a program according to one aspect of the present disclosure are an information processing device and a program including: a feature amount calculation unit configured to calculate a feature amount to be used for object recognition in stages in each of a plurality of hierarchies; an acquisition unit configured to acquire a feature amount to be used for the object recognition calculated by another feature amount calculation unit different from the feature amount calculation unit; and a recognition unit configured to perform the object recognition on the basis of the calculated feature amount and the acquired feature amount.

An information processing method according to one aspect of the present disclosure corresponds to the information processing device according to one aspect of the present disclosure.

In one aspect of the present disclosure, by a feature amount calculation unit, a feature amount to be used for object recognition is calculated in stages in each of a plurality of hierarchies; a feature amount to be used for the object recognition calculated by another feature amount calculation unit different from the feature amount calculation unit is acquired; and the object recognition is performed on the basis of the calculated feature amount and the acquired feature amount.

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Hereinafter, modes for carrying out the present technology will be described. Description will be given in the following order.

1. Outline of Present Disclosure
2. First Embodiment
3. Modification of First Embodiment
4. Second Embodiment
5. Example of Executed by Software 1. Outline of Present Disclosure The present disclosure improves object recognition accuracy by sensing an environment around a user's car for each vehicle, extracting a feature amount from a sensing result, combining a feature amount extracted from another car with the feature amount extracted in the user's car, and recognizing an object on the basis of a combined feature amount.

First, an outline of an object recognition system of the present disclosure will be described with reference to FIG. 1.

Figure 1:
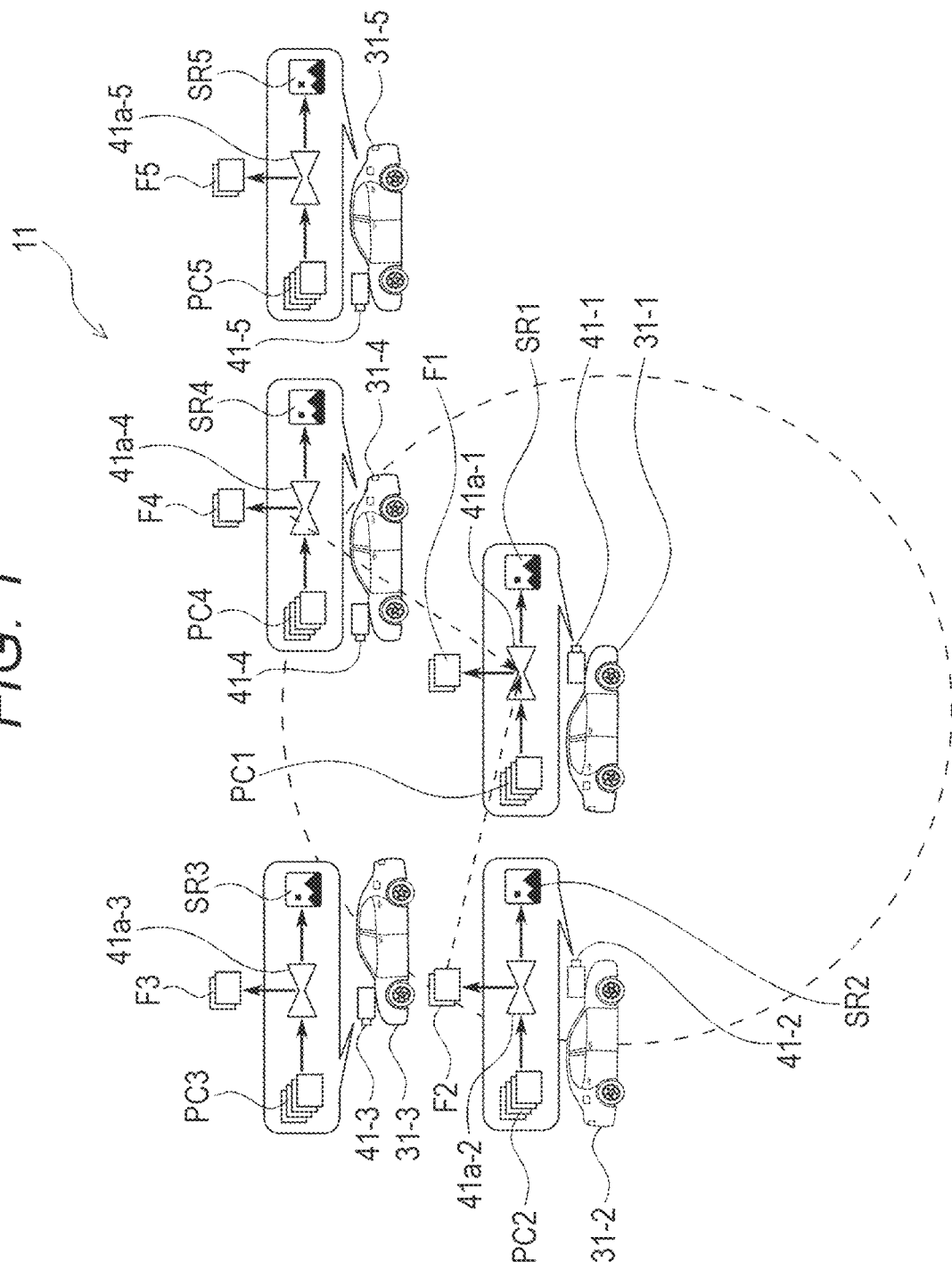
FIG. 1 is a diagram for describing an outline of an object recognition system of the present disclosure.

An object recognition system 11 in FIG. 1 includes a plurality of vehicles 31-1 to 31-5. Note that, in the object recognition system 11 in FIG. 1, the vehicles 31-1 to 31-5 are simply referred to as vehicle(s) 31 in a case where it is not particularly necessary to distinguish the vehicles 31-1 to 31-5. Furthermore, in the object recognition system 11 of FIG. 1, the number of vehicles 31 is assumed to be five but the number of vehicles may be any number as long as there is at least one other than the user's car.

Furthermore, the vehicle 31 that a user gets in is also particularly referred to as a user's car, and the other vehicles 31 are also referred to as the other cars (or another car in a case of referring to one of the other vehicles 31).

In the object recognition system 11 of FIG. 1, the vehicle 31-1 is assumed to be the user's car, and the vehicles 31-2 to 31-5 are assumed to be the other cars (or another car in a case of referring to one of the vehicles 31-2 to 31-5).

Furthermore, although not illustrated, the vehicles 31-1 to 31-5 are configured to be able to communicate with each other by so-called vehicle to vehicle communication within a predetermined distance.

Moreover, the vehicles 31-1 to 31-5 include object recognition devices 41-1 to 41-5, respectively.

The object recognition devices 41-1 to 41-5 include object recognition units 41a-1 to 41a-5, respectively, and the object recognition units 41a-1 to 41a-5 acquire surrounding information as point cloud information PC1 to PC5, respectively, and extract feature amounts F1 to F5 from the point cloud information PC1 to PC5, respectively.

Then, in a case where there is no vehicle around, the object recognition units 41a-1 to 41a-5 execute object recognition processing using the extracted feature amounts F1 to F5 respectively, and output recognition results SR1 to SR5, respectively.

The vehicles 31-1 to 31-5 execute various types of processing on the basis of the recognition results SR1 to SR5, respectively.

Furthermore, in a case where another car is present in the vicinity within a predetermined distance in the surroundings, each of the object recognition units 41a-1 to 41a-5 requests and acquires the feature amount of the another car, and executes the object recognition processing using the feature amount of the another company and the feature amount of the user's car.

That is, in the case of the vehicle 31-1 in FIG. 1, it is assumed that, for example, the vehicles 31-2 and 31-4, which are within a range Z within the predetermined distance indicated by the dotted line and capture the front in a traveling direction of the user's car, are recognized as vehicles in the vicinity of the vehicle 31-1.

In this case, the object recognition unit 41a-1 of the vehicle 31-1 requests the feature amounts from the vehicles 31-2 and 31-4 that are surrounding vehicles.

In response to this request, the object recognition units 41a-2 and 41a-4 of the vehicles 31-2 and 31-4 transmit the respective feature amounts F2 and F4 to the vehicle 31-1.

As a result, the object recognition unit 41a-1 of the vehicle 31-1 acquires the feature amounts F2 and F4 transmitted from the object recognition units 41a-2 and 41a-4 of the vehicles 31-2 and 31-4.

Then, the object recognition unit 41a-1 of the vehicle 31-1 executes the object recognition processing by combining and using the feature amounts F2 and F4 acquired in this manner and the feature amount F1 obtained by itself.

With such processing, the object recognition unit 41a-1 of the vehicle 31-1 executes the object recognition processing using the feature amount F2 and the feature amount F4 based on the point cloud information of a monitoring area of the other cars together with the feature amount F1 based on the point cloud information of the monitoring area of the user's car, whereby improving the object recognition accuracy.

Furthermore, since the feature amounts F2 and F4 transmitted and received are sufficiently smaller information amounts than the point cloud information PC2 and PC4, it is possible to suppress a communication load in vehicle to vehicle communication and improve a communication speed, and it is possible to implement high-precision object recognition processing at high speed.

2. First Embodiment

<Configuration Example of Vehicle Control System>

Figure 2:
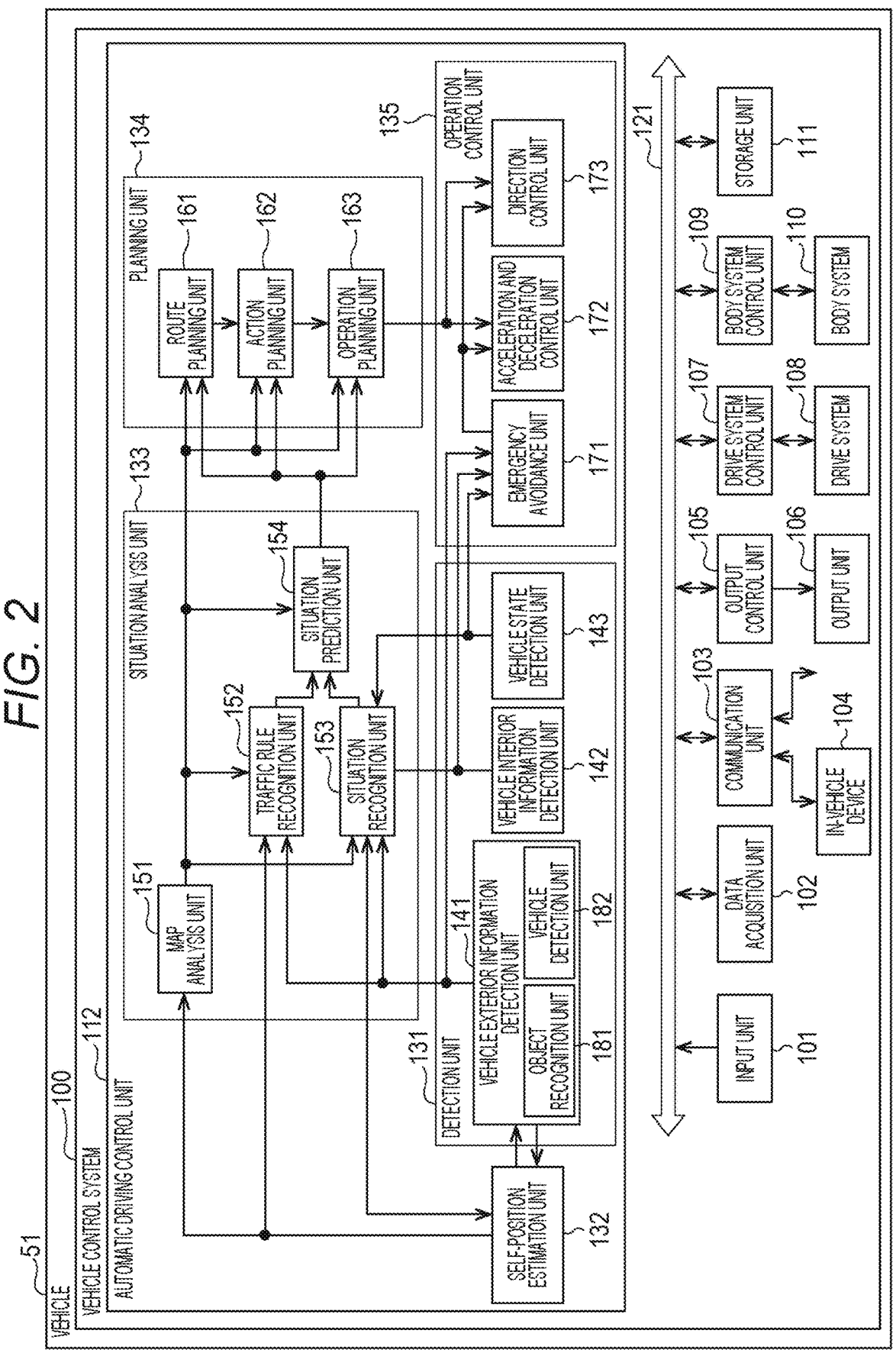
FIG. 2 is a diagram for describing a configuration example of a vehicle control system of the present disclosure.

FIG. 2 is a block diagram illustrating a schematic functional configuration example of a vehicle control system 100 of a vehicle 51 as an example of a mobile body control system of a vehicle to which the present technology according is applicable. The vehicle 51 in FIG. 2 corresponds to the vehicle 31 in FIG. 1.

Furthermore, hereinafter, in a case of distinguishing the vehicle provided with the vehicle control system 100 from other vehicles, the vehicle will be referred to as user's car or user's vehicle.

The vehicle control system 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an on-board communication network conforming to an arbitrary standard such as a controller area network (CAN), a local interconnect network (LIN), a local area network (LAN), or FlexRay (registered trademark), a bus, and the like. Note that the units of the vehicle control system 100 may be directly connected without the communication network 121.

Note that, hereinafter, the case where the units of the vehicle control system 100 perform communication via the communication network 121, the description of the communication network 121 is omitted. For example, the case where the input unit 101 and the automatic driving control unit 112 perform communication via the communication network 121 will be simply described as the input unit 101 and the automatic driving control unit 112 performing communication.

The input unit 101 includes a device used by a passenger to input various data, instructions, and the like. For example, the input unit 101 includes operation devices such as a touch panel, a button, a microphone, a switch, and a lever, an operation device capable of inputting data, instructions, and the like by a method other than a manual operation, such as voice or gesture, and the like. Furthermore, for example, the input unit 101 may be a remote control device using infrared rays or other radio waves, or an externally connected device such as a mobile device or a wearable device corresponding to the operation of the vehicle control system 100. The input unit 101 generates an input signal on the basis of the data, instructions, and the like input by the passenger, and supplies the input signal to each unit of the vehicle control system 100.

The data acquisition unit 102 includes various sensors and the like that acquire data to be used for the processing of the vehicle control system 100, and supplies the acquired data to each unit of the vehicle control system 100.

For example, the data acquisition unit 102 includes various sensors for detecting the state of the user's car and the like. Specifically, for example, the data acquisition unit 102 includes a gyro sensor, an acceleration sensor, an inertial measurement device (IMU), sensors for detecting an operation amount of an accelerator pedal, an operation amount of a brake pedal, a steering angle of a steering wheel, an engine speed, a motor speed, a rotation speed of wheels, or the like, and the like.

Furthermore, for example, the data acquisition unit 102 includes various sensors for detecting information outside the user's car. Specifically, for example, the data acquisition unit 102 includes imaging devices such as a time of flight (ToF) camera, a stereo camera, a monocular camera, an infrared camera, and other cameras. Furthermore, for example, the data acquisition unit 102 includes an environment sensor for detecting a weather, a meteorological phenomenon, or the like, and ambient information detection sensors for detecting an object around the user's car. The environment sensor includes, for example, a raindrop sensor, a fog sensor, a sunshine sensor, a snow sensor, and the like. The ambient information detection sensors include, for example, an ultrasonic sensor, a radar device, a light detection and ranging or laser imaging detection and ranging (LiDAR) device, a sonar, and the like.

Moreover, the data acquisition unit 102 includes, for example, various sensors for detecting a current position of the user's car. Specifically, for example, the data acquisition unit 102 includes a global navigation satellite system (GNSS) receiver that receives a GNSS signal from a GNSS satellite.

Furthermore, for example, the data acquisition unit 102 includes various sensors for detecting information inside the vehicle. Specifically, for example, the data acquisition unit 102 includes an imaging device that images a driver, a biosensor that detects biometric information of the driver, a microphone that collects sound in a vehicle interior, and the like. The biosensor is provided, for example, on a seating surface, a steering wheel, or the like, and detects the biometric information of a passenger sitting on a seat or the driver holding the steering wheel.

The communication unit 103 communicates with the in-vehicle device 104 and various devices outside the vehicle, a server, a base station, and the like, transmits data supplied from each unit of the vehicle control system 100, and supplies received data to each unit of the vehicle control system 100. Note that a communication protocol supported by the communication unit 103 is not especially limited, and the communication unit 103 can support a plurality of types of communication protocols.

For example, the communication unit 103 performs wireless communication with the in-vehicle device 104, using a wireless LAN, Bluetooth (registered trademark), near field communication (NFC), a wireless USB (WUSB), or the like. Furthermore, for example, the communication unit 103 performs wired communication with the in-vehicle device 104, using a universal serial bus (USB), a high-definition multimedia interface (HDMI, registered trademark), a mobile high-definition link (MHL), or the like via a connection terminal (not illustrated) (and a cable if necessary).

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal (for example, a terminal of a pedestrian or a shop, or a machine type communication (MTC) terminal) existing in the vicinity of the user's car, using a peer to peer (P2P) technology. Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon reception unit, and receives a radio wave or an electromagnetic wave transmitted from a wireless station or the like installed on a road, and acquires information such as a current position, congestion, traffic regulation, or required time.

The in-vehicle device 104 includes, for example, a mobile device or a wearable device of a passenger, an information device carried in or attached to the user's vehicle, a navigation device for searching for a route to an arbitrary destination, and the like.

The output control unit 105 controls output of various types of information to the passenger of the user's car or to the outside of the vehicle. The output control unit 105 controls output of visual information (for example, image data) and auditory information (for example, sound data) from the output unit 106 by generating an output signal including at least one of the visual information or the auditory information and supplying the output signal to the output unit 106, for example. Specifically, for example, the output control unit 105 synthesizes image data captured by different imaging devices of the data acquisition unit 102 to generate a bird's-eye view image, a panoramic image, or the like, and supplies an output signal including the generated image to the output unit 106. Furthermore, for example, the output control unit 105 generates sound data including a warning sound, a warning message, or the like for dangers of collision, contact, entry to a dangerous zone, or the like and supplies an output signal including the generated sound data to the output unit 106.

The output unit 106 includes a device capable of outputting the visual information or the auditory information to the passenger of the user's car or to the outside of the vehicle. For example, the output unit 106 includes a display device, an instrument panel, an audio speaker, headphones, a wearable device such as a glasses-type display worn by the passenger, a projector, a lamp, or the like. The display device included in the output unit 106 may be, for example, a head-up display, a transmission-type display, or a display for displaying the visual information in a field of view of the driver, such as a device having an augmented reality (AR) display function, in addition to a device having a normal display.

The drive system control unit 107 controls the drive system 108 by generating various control signals and supplying the control signals to the drive system 108. Furthermore, the drive system control unit 107 supplies a control signal to each unit other than the drive system 108 to issue notification of a control state of the drive system 108, or the like, as needed.

The drive system 108 includes various devices related to the drive system of the user's car. For example, the drive system 108 includes a drive force generation device for generating a drive force of an internal combustion engine or a drive motor, a drive force transmission mechanism for transmitting the drive force to the wheels, a steering mechanism for adjusting the steering angle, a braking device for generating a braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 and issues notification of a control state of the body system 110, or the like, as needed.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-precision map such as a dynamic map, a global map having less accuracy than the high-precision map but covering a large area, and a local map including information around the user's car.

The automatic driving control unit 112 performs control related to the automatic driving such as autonomous traveling or driving assist. Specifically, for example, the automatic driving control unit 112 performs cooperative control for the purpose of implementing an advanced driver assistance system (ADAS) function including collision avoidance or shock mitigation of the user's car, following travel based on a vehicular gap, vehicle speed maintaining travel, collision warning of the user's car, lane out warning of the user's car, and the like. Furthermore, for example, the automatic driving control unit 112 performs the cooperative control for the purpose of automatic driving and the like of autonomous travel without depending on an operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the user's car on the basis of data or signals from each unit of the vehicle control system 100. For example, the vehicle exterior information detection unit 141 performs detection processing, recognition processing, and tracking processing, for an object around the user's car, and processing of detecting a distance to the object. Objects to be detected include, for example, vehicles, people, obstacles, structures, roads, traffic lights, traffic signs, road markings, and the like. Furthermore, for example, the vehicle exterior information detection unit 141 performs processing of detecting an environment around the user's car. The surrounding environment to be detected includes, for example, weather, temperature, humidity, brightness, road surface condition, and the like. The vehicle exterior information detection unit 141 supplies data indicating results of the detection processing to the self-position estimation unit 132, a map analysis unit 151, a traffic rule recognition unit 152, and a situation recognition unit 153 of the situation analysis unit 133, and an emergency avoidance unit 171 and the like of the operation control unit 135.

The vehicle exterior information detection unit 141 further includes an object recognition unit 181 and a vehicle detection unit 182.

The object recognition unit 181 has a configuration corresponding to the object recognition unit 41a in FIG. 1, performs object authentication processing on the basis of a point cloud (point cloud information) supplied from the ambient information detection sensors such as an ultrasonic sensor, a radar, a light detection and ranging or laser imaging detection and ranging (LiDAR), a stereo camera, and a sonar of the data acquisition unit 102, and authenticates an object in units of points of a point cloud around the user's car.

The vehicle detection unit 182 detects approach of another car around the user's car by the image captured by the imaging device such as a camera of the data acquisition unit 102 or the vehicle to vehicle communication performed with the another car via the communication unit 103, for example.

More specifically, the object recognition unit 181 calculates a feature amount of a sensing result including a point cloud by a deep neural network (DNN), performs the object recognition processing on the basis of a calculation result, and recognizes an object in units of points.

At this time, when the approach of another car around the user's car is detected by the vehicle detection unit 182, the object recognition unit 181 requests the another car and acquires the feature amount calculated by the object recognition unit 181 of the another car by vehicle to vehicle communication or the like, and combines the acquired feature amount with the feature amount calculated by itself and performs the object authentication processing.

As a result, the object recognition unit 181 becomes able to perform the object authentication corresponding to all the point clouds around the user's car, and can improve the object authentication accuracy.

Note that the configuration of the object recognition unit 181 will be described in detail below.

The vehicle interior information detection unit 142 performs processing of detecting information inside the vehicle on the basis of data or signals from each unit of the vehicle control system 100. For example, the vehicle interior information detection unit 142 performs driver authentication processing and recognition processing, driver state detection processing, passenger detection processing, vehicle interior environment detection processing, and the like. The state of the driver to be detected includes, for example, a physical condition, an arousal level, a concentration level, a fatigue level, a line-of-sight direction, or the like. The environment in the vehicle to be detected includes, for example, temperature, humidity, brightness, odor, and the like. The vehicle interior information detection unit 142 supplies data indicating results of the detection processing to the situation recognition unit 153 of the situation analysis unit 133, the emergency avoidance unit 171 of the operation control unit 135, and the like.

The vehicle state detection unit 143 performs processing of detecting the state of the user's car on the basis of data or signals from each unit of the vehicle control system 100. The state of the user's car to be detected includes, for example, a speed, an acceleration, a steering angle, presence or absence of abnormality, content of abnormality, a state of driving operation, position and tilt of a power seat, a state of door lock, a state of another in-vehicle device, or the like. The vehicle state detection unit 143 supplies data indicating results of the detection processing to the situation recognition unit 153 of the situation analysis unit 133, the emergency avoidance unit 171 of the operation control unit 135, and the like.

The self-position estimation unit 132 performs processing of estimating the position, posture, and the like of the user's car on the basis of the data or signals from the units of the vehicle control system 100 such as the vehicle exterior information detection unit 141 and the situation recognition unit 153 of the situation analysis unit 133. Furthermore, the self-position estimation unit 132 generates a local map (hereinafter referred to as self-position estimation map) to be used for estimating the self-position, as needed. The self-position estimation map is a high-precision map using a technology such as simultaneous localization and mapping (SLAM), or the like. The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the user's car and its surroundings. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111, using the data or signals from the units of the vehicle control system 100 such as the self-position estimation unit 132 and the vehicle exterior information detection unit 141, as needed, and builds a map including information necessary for automatic driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs processing of recognizing a traffic rule around the user's car on the basis of the data or signals from the units of the vehicle control system 100 such as the self-position estimation unit 132, the vehicle exterior information detection unit 141, and the map analysis unit 151. By the recognition processing, for example, the position and state of signals around the user's car, the content of traffic regulation around the user's car, a travelable lane, and the like are recognized. The traffic rule recognition unit 152 supplies data indicating a result of the recognition processing to the situation prediction unit 154 and the like.

The situation recognition unit 153 performs processing of recognizing the situation regarding the user's car on the basis of the data or signals from the units of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing a situation of the user's car, a situation around the user's car, a situation of the driver of the user's car, and the like. Furthermore, the situation recognition unit 153 generates a local map (hereinafter referred to as situation recognition map) used for recognizing the situation around the user's car, as needed. The situation recognition map is, for example, an occupancy grid map.

The situation of the user's car to be recognized includes, for example, the position, attitude, movement (for example, speed, acceleration, moving direction, and the like) of the user's car, and the presence or absence and content of abnormality, and the like. The situation around the user's car to be recognized includes, for example, types and positions of surrounding stationary objects, types of surrounding moving objects, positions and motions (for example, speed, acceleration, moving direction, and the like), configurations of surrounding roads and conditions of road surfaces, as well as surrounding weather, temperature, humidity, brightness, and the like. The state of the driver to be recognized includes, for example, physical condition, arousal level, concentration level, fatigue level, line-of-sight motion, traveling operation, and the like.

The situation recognition unit 153 supplies the data indicating a result of the recognition processing (including the situation recognition map, as needed) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the user's car on the basis of the data or signals from the units of the vehicle control system 100 such as the map analysis unit 151, the traffic rule recognition unit 152, and the situation recognition unit 153. For example, the situation prediction unit 154 performs processing of predicting the situation of the user's car, the situation around the user's car, the situation of the driver, and the like.

The situation of the user's car to be predicted includes, for example, a behavior of the user's car, occurrence of abnormality, a travelable distance, and the like. The situation around the user's car to be predicted includes, for example, a behavior of a moving object around the user's car, a change in a signal state, a change in the environment such as weather, and the like. The situation of the driver to be predicted includes, for example, a behavior and physical conditions of the driver, and the like.

The situation prediction unit 154 supplies data indicating a result of the prediction processing together with the data from the traffic rule recognition unit 152 and the situation recognition unit 153 to the route planning unit 161, the action planning unit 162, the operation planning unit 163 of the planning unit 134, and the like.

The route planning unit 161 plans a route to a destination on the basis of the data or signals from the units of the vehicle control system 100 such as the map analysis unit 151 and the situation prediction unit 154. For example, the route planning unit 161 sets a route to a destination specified from a current position on the basis of the global map. Furthermore, for example, the route planning unit 161 appropriately changes the route on the basis of situations of congestion, accidents, traffic regulations, construction, and the like, the physical conditions of the driver, and the like. The route planning unit 161 supplies data indicating the planned route to the action planning unit 162 and the like.

The action planning unit 162 plans an action of the user's car for safely traveling in the route planned by the route planning unit 161 within a planned time on the basis of the data or signals from the units of the vehicle control system 100 such as the map analysis unit 151 and the situation prediction unit 154. For example, the action planning unit 162 makes a plan of starting, stopping, traveling directions (for example, forward, backward, turning left, turning right, turning, and the like), driving lane, traveling speed, passing, and the like. The action planning unit 162 supplies data indicating the planned action of the user's car to the operation planning unit 163 and the like.

The operation planning unit 163 plans an operation of the user's car for implementing the action planned by the action planning unit 162 on the basis of the data or signals from the units of the vehicle control system 100 such as the map analysis unit 151 and the situation prediction unit 154. For example, the operation planning unit 163 plans acceleration, deceleration, a traveling track, and the like. The operation planning unit 163 supplies data indicating the planned operation of the user's car to an acceleration and deceleration control unit 172 and a direction control unit 173 of the operation control unit 135, and the like.

The operation control unit 135 controls the operation of the user's car. The operation control unit 135 includes the emergency avoidance unit 171, the acceleration and deceleration control unit 172, and the direction control unit 173.

The emergency avoidance unit 171 performs processing of detecting an emergency situation such as collision, contact, entry into a dangerous zone, driver's abnormality, vehicle's abnormality, and the like on the basis of the detection results of the vehicle exterior information detection unit 141, the vehicle interior information detection unit 142, and the vehicle state detection unit 143. In a case where the emergency avoidance unit 171 detects occurrence of the emergency situation, the emergency avoidance unit 171 plans the operation of the user's car for avoiding the emergency situation, such as sudden stop or sharp turn. The emergency avoidance unit 171 supplies data indicating the planned operation of the user's car to the acceleration and deceleration control unit 172, the direction control unit 173, and the like.

The acceleration and deceleration control unit 172 performs acceleration and deceleration for implementing the operation of the user's car planned by the operation planning unit 163 or the emergency avoidance unit 171. For example, the acceleration and deceleration control unit 172 calculates a control target value of a drive force generation device or a braking device for implementing the planned acceleration, deceleration, or sudden stop, and supplies a control command indicating the calculated control target value to the drive system control unit 107.

The direction control unit 173 controls a direction for implementing the operation of the user's car planned by the operation planning unit 163 or the emergency avoidance unit 171. For example, the direction control unit 173 calculates a control target value of a steering mechanism for implementing the traveling track or sharp turn planned by the operation planning unit 163 or the emergency avoidance unit 171, and supplies a control command indicating the calculated control target value to the drive system control unit 107.

<First Configuration Example of Object Recognition Unit>

Next, a first configuration example of the object recognition unit 181 will be described with reference to FIG. 3.

The object recognition unit 181 performs the object recognition processing on the basis of the point cloud PC supplied from the data acquisition unit 102 from a stereo camera or sensors such as LiDAR, and outputs a global feature amount R for each point.

The point cloud PC is, for example, point cloud information including position information of each of a point (x1, y1, z1), a point (x2, y2, z2), a point (x3, y3, z3), . . . , and a point (xn, yn, zn).

Furthermore, the global feature amount R is a global feature amount R (x1, y1, z1), a global feature amount R (x2, y2, z2), a global feature amount R (x3, y3, z3), . . . , and a global feature amount R (xn, yn, zn) corresponding to (x1, y1, z1), (x2, y2, z2), and (x3, y3, z3), and is a result of recognizing an object in units of points.

More specifically, the object recognition unit 181 includes a local feature amount calculation unit 201, a feature amount combining unit 202, a global feature amount calculation unit 203, a recognition unit 204, a feature amount extraction unit 205, a feature amount transmission control unit 206, a feature amount reception control unit 207, and a feature amount selection unit 208.

The local feature amount calculation unit 201 calculates the feature amount for each point in the point cloud PC in stages, and includes a first feature amount calculation unit 221, a second feature amount calculation unit 222, and a third feature amount calculation unit 223.

The first feature amount calculation unit 221 includes multi layer perceptrons (MLPs) 231-1 to 231-$n$ for each point, calculates a first feature amount that is a first-stage feature amount for each point of the point cloud PC, and outputs the first feature amount to the second feature amount calculation unit 222 and a first feature amount extraction unit 281 of the feature amount extraction unit 205.

The second feature amount calculation unit 222 includes MLPs 241-1 to 241-$n$ for each point, calculates a second feature amount that is a second-stage feature amount on the basis of the first feature amount supplied from the first feature amount calculation unit 221 for each point of the point cloud PC, and outputs a second feature amount to the third feature amount calculation unit 223 and a second feature amount extraction unit 282 of the feature amount extraction unit 205.

The third feature amount calculation unit 223 includes MLPs 251-1 to 251-$n$ for each point, calculates a third feature amount that is a third-stage feature amount on the basis of the second feature amount supplied from the second feature amount calculation unit 222 for each point of the point cloud PC, and outputs a third feature amount to the feature amount combining unit 202 and a third feature amount extraction unit 283 of the feature amount extraction unit 205.

The feature amount combining unit 202 combines first, second, and third feature amounts supplied from another car via the communication unit 103, the feature amount reception control unit 207, and the feature amount selection unit 208 with the third feature amount supplied from the local feature amount calculation unit 201, and outputs a combined result to the global feature amount calculation unit 203.

More specifically, the feature amount combining unit 202 includes a second feature amount calculation unit 271 and a third feature amount calculation unit 272.

The second feature amount calculation unit 271 and the third feature amount calculation unit 272 have the same functions as the second feature amount calculation unit 222 and the third feature amount calculation unit 223, calculate the second feature amount and the third feature amount from the first feature amount and the second feature amount supplied from the another car as necessary, and finally calculate the third feature amount based on the feature amounts of the another car.

Then, the feature amount combining unit 202 combines the third feature amount obtained from the another car and the third feature amount calculated by the local feature amount calculation unit 201 by, for example, a product-sum with set weights.

The weights may be equally set or may be set according to the distance to the another car and whether or not the DNN structures are the same.

The global feature amount calculation unit 203 calculates the global feature amount R at each point on the basis of the feature amount (substantially the third feature amount) supplied from the feature amount combining unit 202 by Maxpooling, for example, and outputs the global feature amount R to the recognition unit 204. The recognition unit 204 performs the object recognition processing on the basis of the global feature amount R, and outputs an object recognition result that is a processing result.

Figure 3:
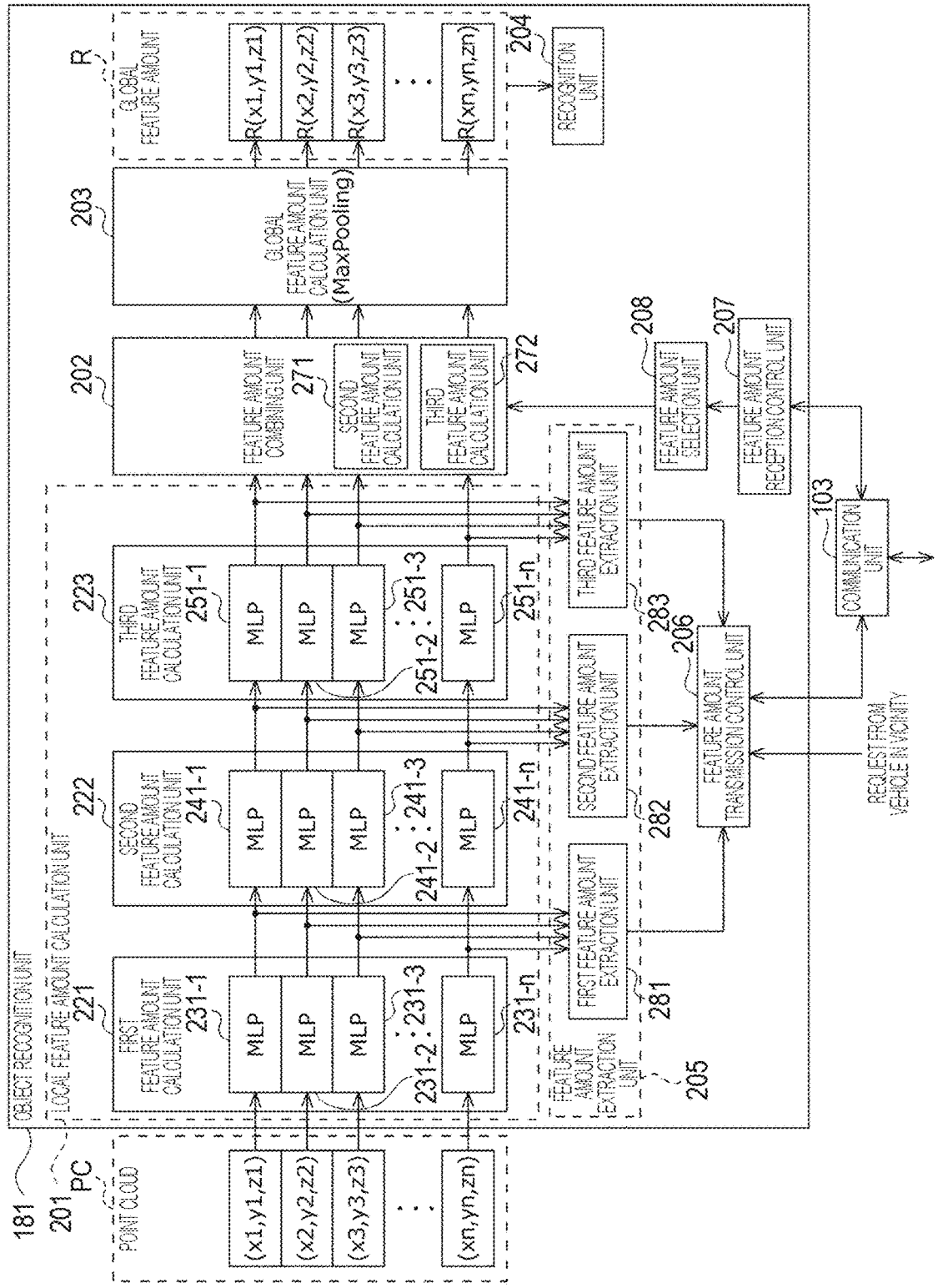
FIG. 3 is a block diagram for describing a configuration example of a first embodiment of an object recognition unit of the present disclosure.

That is, in the object recognition unit 181 in FIG. 3 of the present disclosure, the local feature amount calculation unit 201, the feature amount combining unit 202, and the global feature amount calculation unit 203 form PointNet by DNN.

Here, the PointNet refers to a neural network that receives point cloud information as input and outputs a predetermined processing result on the basis of the input point cloud information.

That is, the first feature amount calculation unit 221, the second feature amount calculation unit 222, and the third feature amount calculation unit 223 in the local feature amount calculation unit 201 are intermediate layers that extract local features.

Therefore, the local feature amount calculation unit 201 in FIG. 3 is configured to obtain the feature amount by a three-stage hierarchical structure like the first feature amount calculation unit 221 to the third feature amount calculation unit 223, but the number of hierarchies may be any number other than two or three as long as the hierarchical structure has at least two or more hierarchies corresponding to the input layer and the output layer.

Then, the local feature amount calculation unit 201 and the global feature amount calculation unit 203 are assumed to have performed learning (backpropagation) using, for example, a position (x, y, z) and a color (r, g, b) that are point clouds, as inputs, and a semantic segmentation label as a correct answer.

The feature amount extraction unit 205 extracts the feature amount that is a calculation result of the local feature amount calculation unit 201 and supplies the feature amount to the feature amount transmission control unit 206.

More specifically, the feature amount extraction unit 205 includes a first feature amount extraction unit 281, a second feature amount extraction unit 282, and a third feature amount extraction unit 283.

The first feature amount extraction unit 281 extracts a first feature amount that is a calculation result of the first feature amount calculation unit 221 of the local feature amount calculation unit 201, and outputs the first feature amount to the feature amount transmission control unit 206.

The second feature amount extraction unit 282 extracts a second feature amount that is a calculation result of the second feature amount calculation unit 222 of the local feature amount calculation unit 201, and outputs the second feature amount to the feature amount transmission control unit 206.

The third feature amount extraction unit 283 extracts a third feature amount that is a calculation result of the third feature amount calculation unit 223 of the local feature amount calculation unit 201, and outputs the third feature amount to the feature amount transmission control unit 206.

When there is a request for feature amounts from another car around the user's car, the feature amount transmission control unit 206 controls the communication unit 103 to transmit the first to third feature amounts extracted by, for example, vehicle to vehicle communication or the like to the requested another car.

At this time, the feature amount transmission control unit 206 transmits each of the feature amounts with information for identifying which of the first feature amount, the second feature amount, and the third feature amount the each feature amount is.

Furthermore, the feature amount transmission control unit 206 transmits the feature amounts with information indicating a deep neural network (DNN) structure of the local feature amount calculation unit 201 of the user's car. Here, the information indicating the DNN structure is, for example, values of weighting coefficients for the MLPs 231, 241, and 251 corresponding to each point of the first feature amount calculation unit 221 to the third feature amount calculation unit 223 that are the layers in the DNN.

In a case where there are other cars in the vicinity of a predetermined distance around the user's car, the feature amount reception control unit 207 controls the communication unit 103 to request the other cars in the vicinity of the user's car to transmit the feature amounts, acquires the feature amounts transmitted from the other cars in response to the request and supplies the feature amounts to the feature amount selection unit 208.

The feature amount selection unit 208 selects necessary feature amounts from among the feature amounts from the other companies present around the user's car supplied from the feature amount reception control unit 207, and outputs the selected feature amounts to the feature amount combining unit 202. That is, for example, the feature amount selection unit 208 selects only the feature amounts in a predetermined time range from a current time, and outputs the feature amounts to the feature amount combining unit 202.

Furthermore, the feature amount selection unit 208 selectively extracts only the feature amounts having the same DNN structure of the user's car on the basis of the information indicating the DNN structures of the other cars assigned to the respective feature amounts supplied from the other cars, and outputs the extracted feature amounts to the feature amount combining unit 202.

The feature amount combining unit 202 combines the feature amounts according to the feature amounts supplied from the feature amount selection unit 208 in this manner and the DNN structures of the other cars, and outputs the combined feature amount to the global feature amount calculation unit 203.

Here, when combining the third feature amount obtained from the feature amount supplied from the feature amount selection unit 208 and the third feature amount supplied from the local feature amount calculation unit 201 by the product-sum using weights, the feature amount combining unit 202 may adjust the weights and combine the third feature amounts.

For example, in a case where the DNN structure of the user's car and the DNN structure of the another car are different, the feature amount combining unit 202 may reduce the weight of the feature amount of the another car and increase the weight of the feature amount of the user's car and combine the feature amounts.

Furthermore, in the case where the DNN structure of the user's car and the DNN structure of the another car are the same, the feature amount combining unit 202 may set the weight of the feature amount of the another car and the weight of the feature amount of the user's car to be the same and combine the feature amounts.

Moreover, each of the first feature amount calculation unit 221, the second feature amount calculation unit 222, and the third feature amount calculation unit 223 constituting the local feature amount calculation unit 201 constitutes a local processing structure for calculating the feature amount for each point.

Furthermore, the global feature amount calculation unit 203 constitutes a global processing structure that performs processing that does not affect the global feature amount R as a whole even if the order of the points is changed.

That is, the object recognition unit 181 in FIG. 3 of the present disclosure includes the above-described local processing structure that performs processing for each point and the above-described global processing structure that does not affect the processing result even if the order of the points is changed, and the PointNet is formed as a whole.

Then, in the object recognition unit 181 in FIG. 3 of the present disclosure, the feature amount for each point in the point cloud PC is calculated by the local processing structure, and the object recognition processing for each point is performed using the global feature amount R including the calculated feature amounts by the global structure.

<Object Recognition Processing in First Embodiment>

Next, the object recognition processing by the object recognition unit 181 in FIG. 3 according to the first embodiment will be described with reference to the flowcharts in FIGS. 4 and 5.

In step S11, the first feature amount calculation unit 221 of the local feature amount calculation unit 201 acquires the point cloud PC detected by the ambient information detection sensors such as an ultrasonic sensor, a radar, a light detection and ranging or laser imaging detection and ranging (LiDAR), a stereo camera, and a sonar supplied from the data acquisition unit 102.

In step S12, the first feature amount calculation unit 221 calculates the first feature amount from the point cloud PC, and outputs the first feature amount to the second feature amount calculation unit 222 and the first feature amount extraction unit 281 of the feature amount extraction unit 205.

In step S13, the first feature amount extraction unit 281 extracts the first feature amount supplied from the first feature amount calculation unit 221 and outputs the first feature amount to the feature amount transmission control unit 206. As a result, the feature amount transmission control unit 206 adds a timestamp corresponding to the current time in a system clock (not illustrated) to the supplied first feature amount and stores the first feature amount.

In step S14, the second feature amount calculation unit 222 acquires the first feature amount supplied from the first feature amount calculation unit 221, calculates the second feature amount from the first feature amount, and outputs the second feature amount to the third feature amount calculation unit 223 and the second feature amount extraction unit 282 of the feature amount extraction unit 205.

In step S15, the second feature amount extraction unit 282 of the feature amount extraction unit 205 extracts the second feature amount supplied from the second feature amount calculation unit 222 and outputs the second feature amount to the feature amount transmission control unit 206. As a result, the feature amount transmission control unit 206 adds a timestamp corresponding to the current time in the system clock (not illustrated) to the supplied second feature amount and stores the second feature amount.

In step S16, the third feature amount calculation unit 223 acquires the second feature amount supplied from the second feature amount calculation unit 222, calculates the third feature amount from the second feature amount, and outputs the third feature amount as the local feature amount to the feature amount combining unit 202 and the third feature amount extraction unit 283 of the feature amount extraction unit 205.

In step S17, the third feature amount extraction unit 283 of the feature amount extraction unit 205 extracts the third feature amount supplied from the third feature amount calculation unit 223 and outputs the third feature amount to the feature amount transmission control unit 206. As a result, the feature amount transmission control unit 206 adds a timestamp corresponding to the current time in the system clock (not illustrated) to the supplied third feature amount and stores the third feature amount.

In step S18, the feature amount transmission control unit 206 controls the communication unit 103 to determine whether or not the request for feature amounts has been transmitted from surrounding another car.

In step S18, in a case where it is determined that the request for feature amounts has been transmitted from another car, the processing proceeds to step S19.

In step S19, the feature amount transmission control unit 206 receives the request for feature amounts transmitted from the another car.

In step S20, the feature amount transmission control unit 206 selects the first to third feature amounts of the time closest to the current time from among the stored first to third feature amounts.

In step S21, the feature amount transmission control unit 206 controls the communication unit 103 to transmit the selected first to third feature amounts of the time closest to the current time to the another car that has requested feature amounts.

At this time, the feature amount transmission control unit 206 transmits self-position information and self-posture information detected by the self-position estimation unit 132 together to the another car that has requested the feature amounts.

Note that the self-position information and the self-posture information are information for converting the position information of each point of the point cloud PC including a coordinate system (local coordinate system) in the vehicle 51 into a global coordinate system or a local coordinate system of the another car.

Therefore, in a case where the position information of each point in the point cloud PC is expressed in the global coordinate system, the self-position information and the self-posture information are not necessary.

Furthermore, in step S18, in a case where it is determined that there is no request for transmission of the feature amounts, the processing in steps S19 to S21 is skipped, and the feature amounts are not transmitted to the another car.

In step S22 (FIG. 5), the vehicle detection unit 182 detects a vehicle (another car) approaching the user's car by communication with vehicles around the user's car by vehicle to vehicle communication or the like.

In step S23, the feature amount reception control unit 207 determines whether or not other cars are present in the vicinity of the user's car within a predetermined distance from the user's car on the basis of the detection result of the vehicle detection unit 182.

In step S23, for example, as illustrated in FIG. 1, when the vehicles 31-2 and 31-4 as other cars are present within a range of the dotted line indicating the predetermined distance from the vehicle 31-1 as the user's car, it is determined that other cars are present in the vicinity of the user's car. As illustrated in FIG. 1, when it is determined that other cars are present in the vicinity of the user's car, the processing proceeds to step S24.

In step S24, the feature amount reception control unit 207 controls the communication unit 103 to request the other cars within the predetermined distance from the user's car to transmit the feature amounts.

With this processing, the request from another car is received in step S18 described above in the object recognition processing in the other cars, and thus the feature amounts are transmitted from the other cars to the user's car by the processing of steps S19 to S21.

Therefore, in step S25, the feature amount reception control unit 207 controls the communication unit 103 to acquire the feature amounts and position and posture information of the other cars transmitted from the other cars, and supplies the feature amounts and the information to the feature amount selection unit 208.

In step S26, the feature amount selection unit 208 selects the feature amounts of the time added to the timestamp that is closest to the current time among the supplied feature amounts, and outputs the selected feature amounts to the feature amount combining unit 202. At this time, the feature amount selection unit 208 also supplies, to the feature amount combining unit 202, the position and posture information of the another car that has transmitted the selected feature amounts.

In step S27, the feature amount combining unit 202 combines the feature amount transmitted from the another car supplied from the feature amount selection unit 208 and the feature amount transmitted from the local feature amount calculation unit 201, and outputs the combined feature amount to the global feature amount calculation unit 203.

Here, the feature amount combining unit 202 obtains the third feature amount for the first feature amount and the second feature amount among the feature amounts transmitted from the another car, using the built-in second feature amount calculation unit 271 and third feature amount calculation unit 272, and combines the third feature amount supplied from the local feature amount calculation unit 201 for each point.

At this time, the feature amount combining unit 202 sets the weights according to the positional relationship between the another car that has transmitted the feature amounts and the user's car, and the DNN structures, and combines the third feature amounts by the product-sum using the weights. Furthermore, the feature amount combining unit 202 converts the positional information into its own coordinate system on the basis of the position and posture information of the another car, and combines the third feature amount from the another car and the third feature amount calculated by the local feature amount calculation unit 201.

In step S28, the global feature amount calculation unit 203 calculates the global feature amount R by, for example, Maxpooling on the basis of the third feature amount supplied from the feature amount combining unit, and outputs the global feature amount R to the recognition unit 204.

In step S29, the recognition unit 204 performs the object recognition processing for each point in the global feature amount R, and outputs the object recognition result.

In step S30, the object recognition unit 181 determines whether or not an instruction on termination of the processing has been given. In a case where the instruction on the termination has not been given, the processing returns to step S11 (FIG. 4), and the processing in step S11 and subsequent steps is repeated.

Furthermore, in step S23, in a case where it is determined that the vehicle 51 is not present in the vicinity within the predetermined distance of the user's car and no other cars are present, the processing proceeds to step S31.

In step S31, the feature amount combining unit 202 outputs the third feature amount calculated by the local feature amount calculation unit 201 as it is to the global feature amount calculation unit 203.

That is, the fact that there are no other cars in the vicinity of the user's car means that there is no supply of the feature amounts from the other cars. Therefore, the processing proceeds to step S30, and the global feature amount using only the third feature amount by the user's car alone using only the third feature amount calculated in the user's car is calculated, and the object recognition processing is performed.

According to the above series of processing, in the case where another car is present in the vicinity within a predetermined distance from the user's car, the another car is requested to send the feature amounts, and the feature amounts calculated in the object recognition processing of the another car are acquired in response to the request. Then, the feature amount calculated in the user's car and the acquired feature amount of the another car are combined, and the object recognition processing is performed collectively using the feature amounts of the user's car and the another car.

As a result, since the feature amount is obtained by using the sensing result of the another car and the sensing result of the user's car, the object recognition processing can be implemented with the recognition accuracy corresponding to a case of using a sensing result of the entire point cloud.

Furthermore, in the above description, an example in which all the three types of feature amounts of the first feature amount, the second feature amount, and the third feature amount are transmitted to another car or transmitted from the another car has been described. However, some of the types of feature amounts may be transmitted from another car. For example, one of or a combination of two of the three types of the first feature amount, the second feature amount, and the third feature amount may be transmitted.

Furthermore, the feature amounts to be transmitted and received may be randomly sampled according to a communication load, so that the data amount is limited and the data amount may be reduced.

Moreover, in the above description, an example in which the feature amounts are acquired from another car in the vicinity of the user's car, and the feature amount of the another car is combined with the feature amount of the user's car, and the object recognition processing is performed has been described. However, the feature amounts may be acquired from anything other than the vehicle in the vicinity of the user's car as long as the feature amounts can be obtained using a point cloud. For example, feature amounts calculated on the basis of the point cloud acquired by LiDAR or stereo cameras provided at the side of a road are requested and acquired, and the feature amount is combined with the feature amount calculated in the user's car, and the object recognition processing may be executed.

That is, the feature amounts of anything other than the user's car may be acquired from anything other than vehicles by not only the V2V communication described above but also by V2X communication.

Furthermore, in the object recognition processing, the object recognition accuracy can be increased as the number of acquired feature amounts is larger. Therefore, when there are more other cars in the vicinity of the user's car, and the feature amounts are acquired from the more other cars, the object recognition accuracy can be further improved.

Moreover, since the point cloud PC may be any of LiDAR, a stereo camera, a depth image, or the like, sensor fusion can be easily implemented in the object recognition unit 181 of the present disclosure.

Furthermore, the point cloud PC serving as input may have various forms as long as the point cloud information is formed, and may be, for example, three-dimensional point cloud information or two-dimensional point cloud information.

3. Modifications of First Embodiment

In the above description, an example in which in the case where another car is present in the vicinity of the user's car, and when the another car requests the feature amounts, the user's car transmits the feature amounts and also requests the feature amounts, acquires the feature amounts from the another car, and the feature amount of the user's car and the feature amount of the another car are combined and the object recognition processing is collectively performed has been described. However, a condition for the feature amounts to be requested to the another car can be set, and only the feature amounts matching the set condition can be acquired from the another car.

That is, for example, a case where the DNN structure of the user's car is different from the DNN structure of the another car, that is, a case where the weighting coefficients and the like related to the calculations of the first feature amount calculation unit 221, the second feature amount calculation unit 222, and the third feature amount calculation unit 223 are different will be considered.

In such a case, since the feature amounts obtained by the user's car and the another car are not calculated under the same condition, there is a possibility that the recognition accuracy cannot be necessarily improved even if the feature amounts of the user's car and the another car are combined and the object recognition is performed.

Therefore, when the feature amounts are requested from the user's car to the another car, the information of the DNN structure of the user's car (the value of the weighting coefficient when the feature amounts are calculated or the like) is transmitted together as the condition for the requested feature amounts. Then, the another car, which has received the request for the feature amounts, transmits the feature amounts in response to the request only in a case where the DNN structure matches and satisfies the condition.

In this way, only the feature amounts satisfying the condition including the same DNN structure as the DNN structure of the user's car are transmitted from the another car, and the feature amounts of the user's car and the another car calculated under the same DNN structure are combined and the object recognition processing is performed. Therefore, the object recognition accuracy can be improved.

Note that, although the case where the condition for the feature amounts is the DNN structure has been described, another condition may be used. For example, information specifying any one or two of the first feature amount, the second feature amount, and the third feature amount, or information of a time range indicating timing at which the feature amount has been calculated may be used. Furthermore, the condition for the feature amounts may be a condition of limiting the feature amounts to the feature amounts from another car existing outside the field of view of the user's car, may be a condition of excluding the feature amounts of other cars existing behind the user's car, or may be a condition of limiting the feature amounts to only the feature amounts of another car facing the user's car.

Here, the object recognition processing in a case where the condition for feature amounts to be requested to another car is set and the feature amounts are requested in a case where the user's car requests the another car to transmit the feature amounts, and the another car transmits only the feature amounts matching the set condition will be described with reference to the flowcharts in FIGS. 6 and 7.

Figure 4:
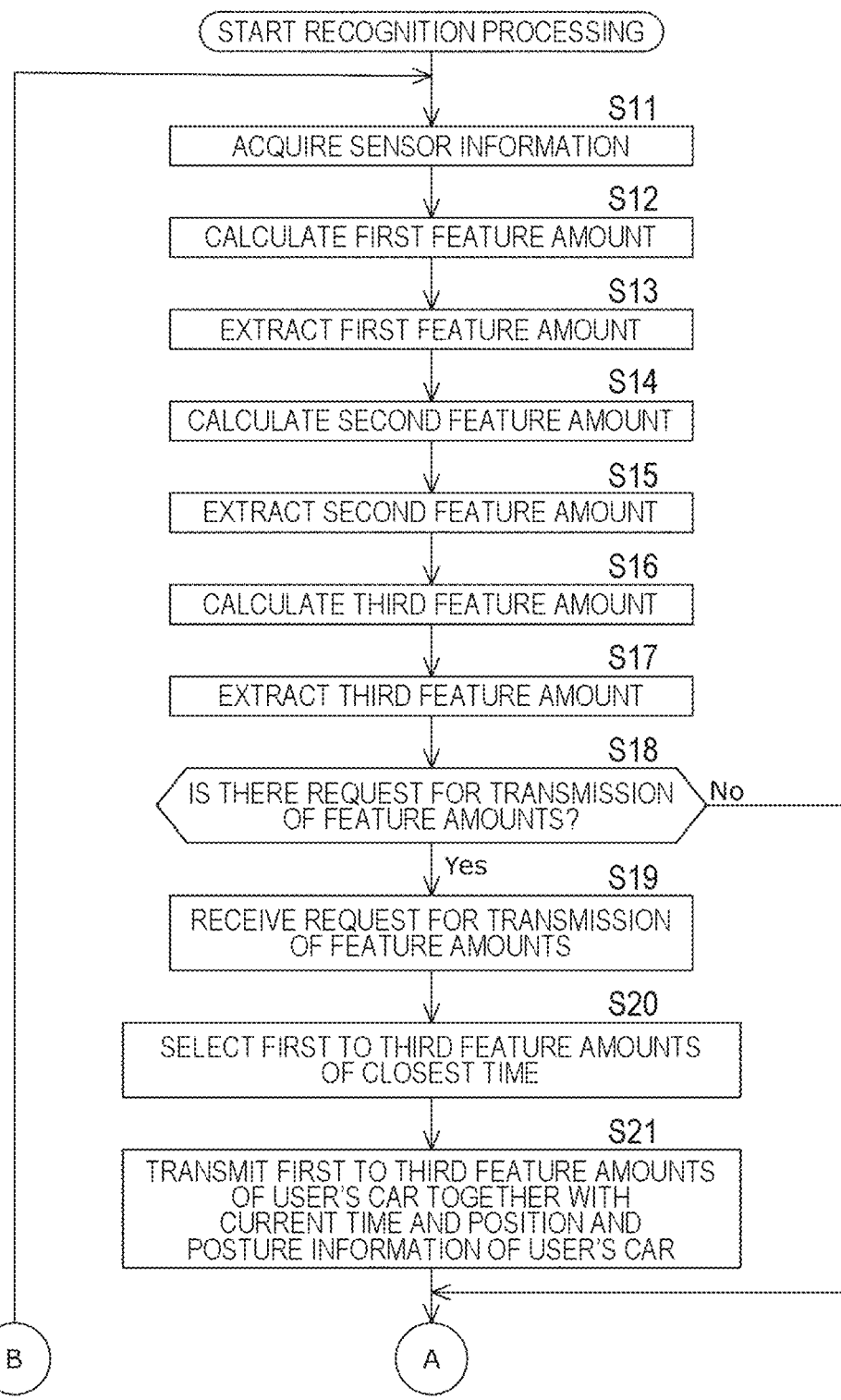
FIG. 4 is a flowchart for describing object recognition processing of the first embodiment.
Figure 5:
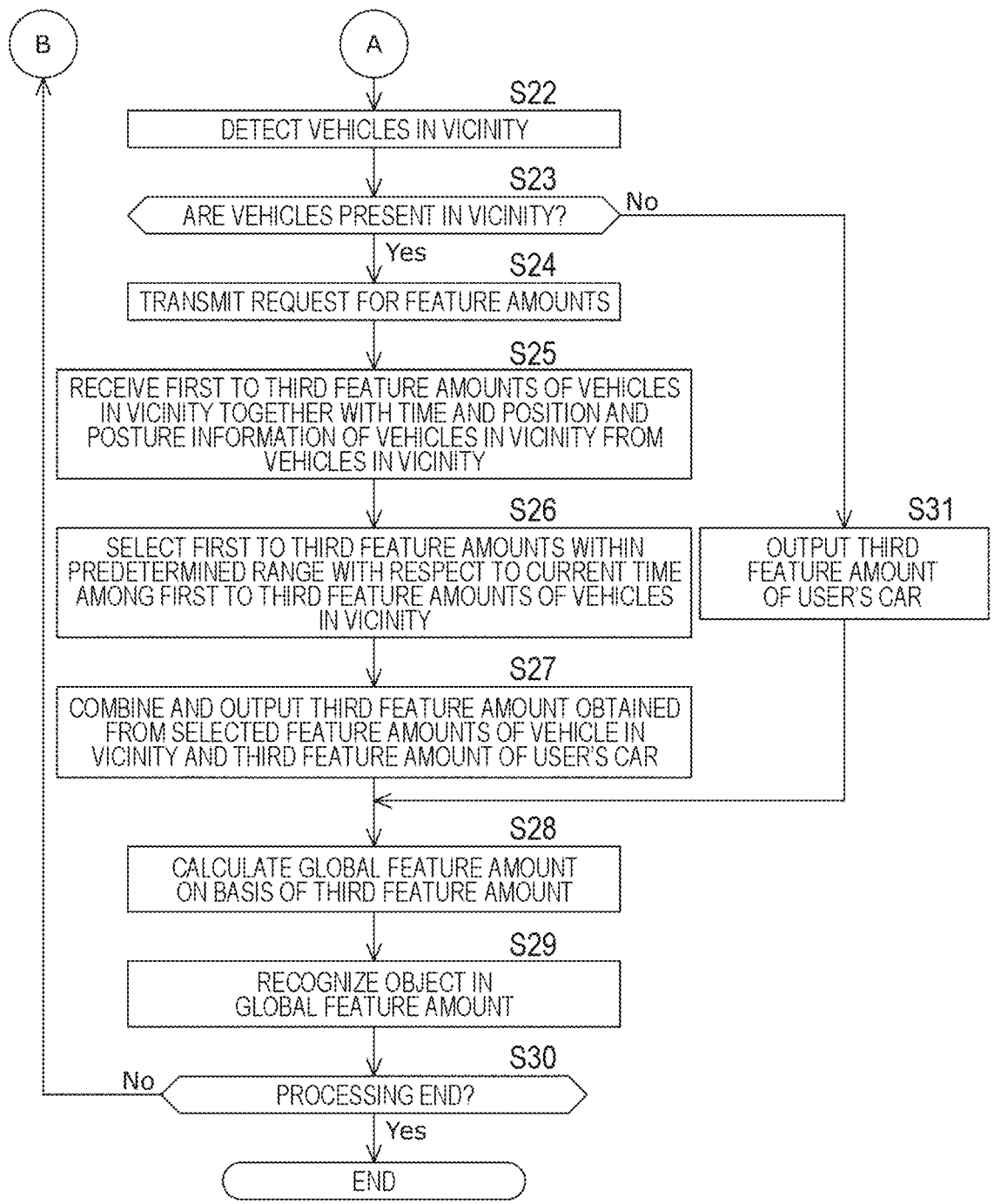
FIG. 5 is a flowchart for describing the object recognition processing of the first embodiment.
Figure 6:
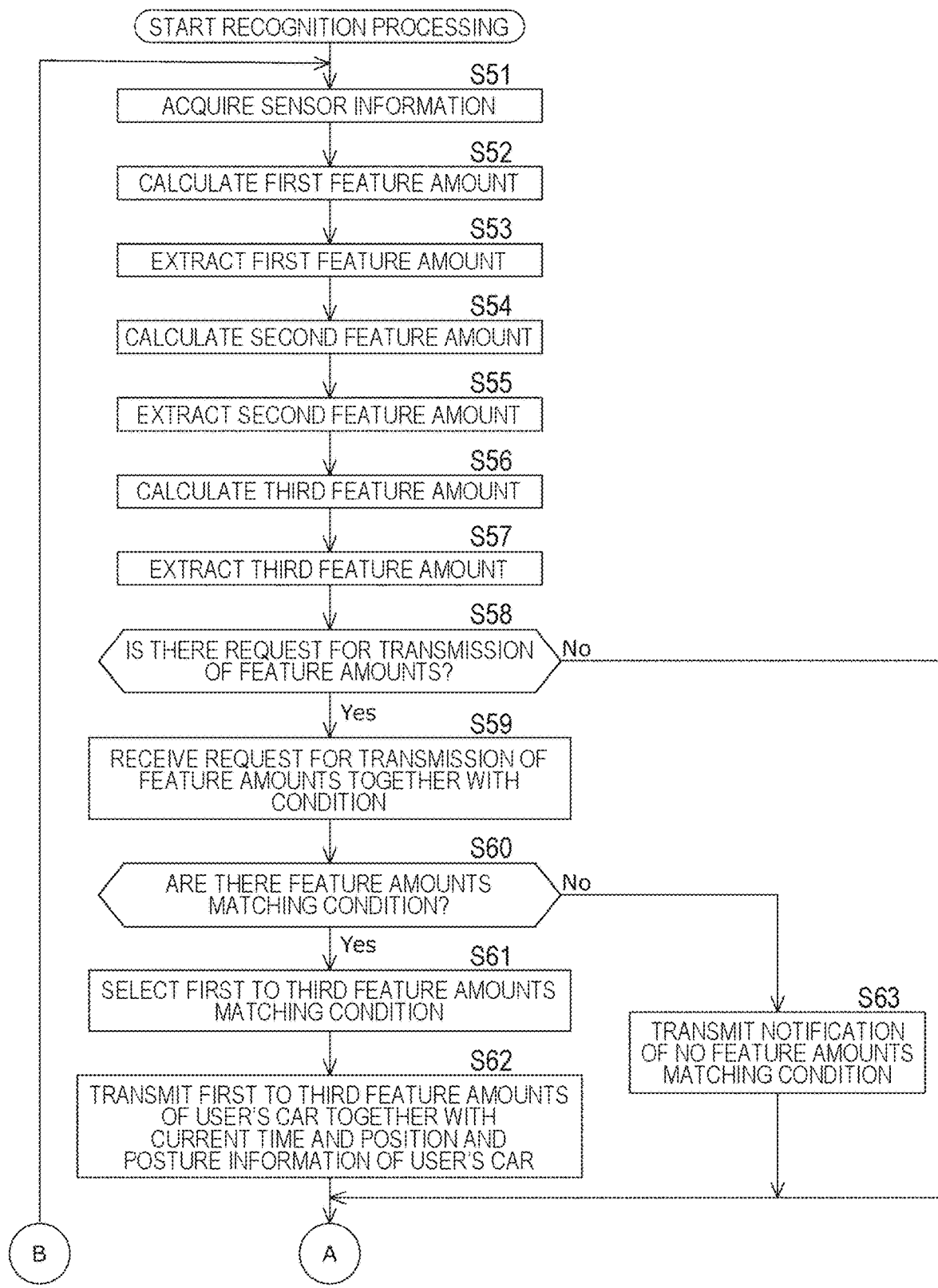
FIG. 6 is a flowchart for describing object recognition processing according to a modification of the first embodiment.
Figure 7:
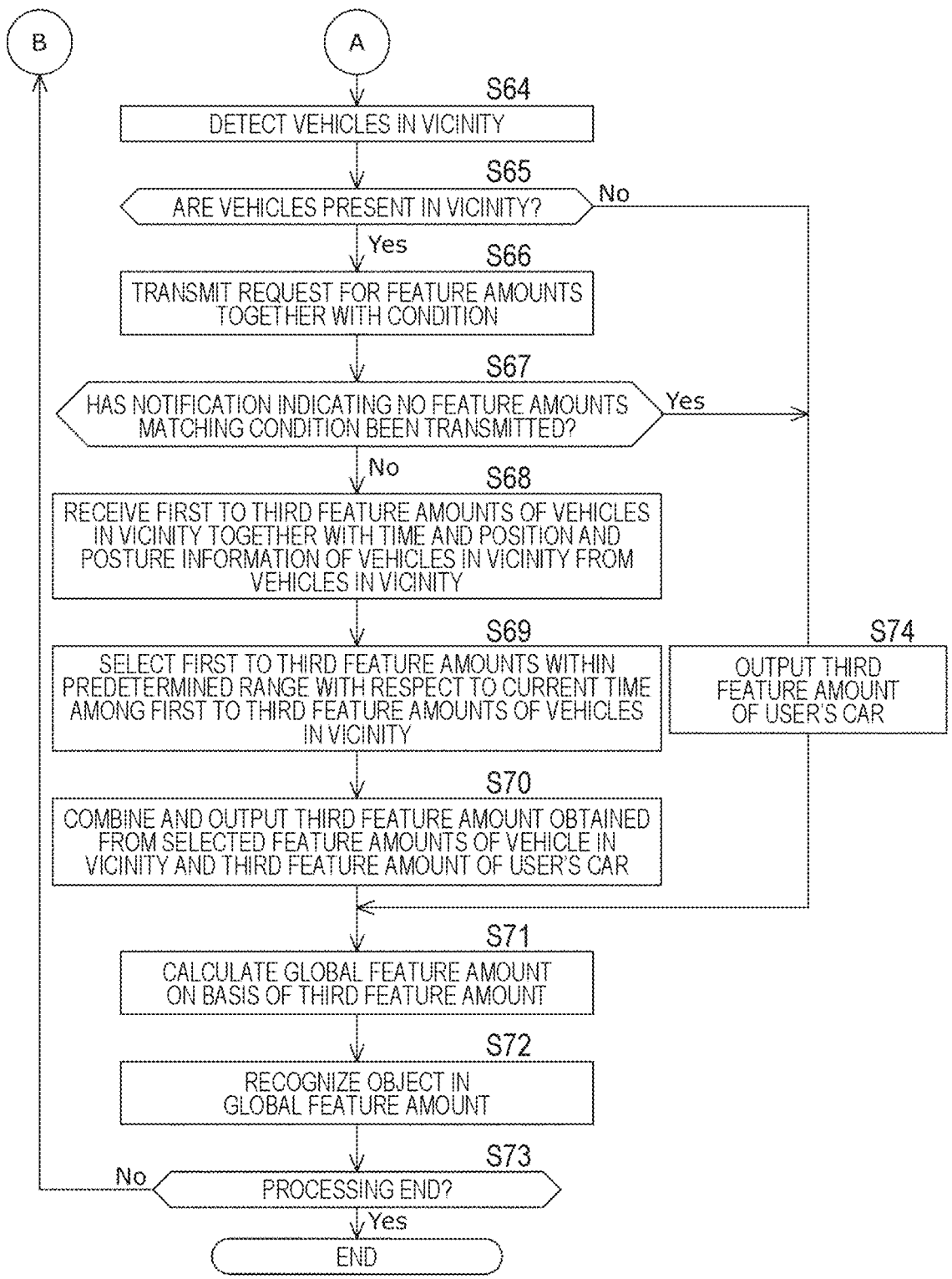
FIG. 7 is a flowchart for describing the object recognition processing according to the modification of the first embodiment.

Note that processing in steps S51 to S58, steps S64 and S65, and steps S71 to S74 in the flowcharts in FIGS. 6 and 7 is similar to the processing in the steps S11 to S18 and steps S28 to S31 in FIGS. 4 and 5, and thus description thereof will be omitted.

That is, in step S58, in a case where it is determined that the request for transmission of feature amounts has been transmitted, the processing proceeds to step S59.

In step S59, the feature amount transmission control unit 206 receives the request for feature amounts transmitted from the another car together with the condition for feature amounts.

In step S60, the feature amount transmission control unit 206 determines whether or not there are feature amounts matching the condition.

In a case where there are the feature amounts matching the condition in step S60, the processing proceeds to step S61.

In step S61, the feature amount transmission control unit 206 selects the feature amounts matching the condition from among the stored first to third feature amounts.

In step S62, the feature amount transmission control unit 206 controls the communication unit 103 to transmit the selected feature amounts matching the condition to the another car that has requested the feature amounts. At this time, the feature amount transmission control unit 206 transmits self-position information and self-posture information detected by the self-position estimation unit 132 together to the another car that has requested the feature amounts.

Note that, in step S60, in a case where there are no feature amounts matching the condition, the processing proceeds to step S63.

In step S63, the feature amount transmission control unit 206 controls the communication unit 103 to transmit a notification indicating that there are no feature amounts matching the condition to the another car that has requested the feature amounts.

According to the above processing, in the case where the feature amounts are requested from another car, and when there are the feature amounts matching the condition received together with the request, the feature amounts matching the condition are transmitted to the another car, whereas in the case where there are no feature amounts matching the condition, the notification notifying that there are no feature amounts matching the condition is transmitted.

Furthermore, in the case where another car is present in the vicinity of the user's car, in step S66 (FIG. 7), the feature amount reception control unit 207 controls the communication unit 103 to transmit the notification requesting feature amounts together with the condition information for feature amounts to the another car in the vicinity within a predetermined distance from the user's car.

In step S67, the feature amount reception control unit 207 determines whether or not a notification indicating that there are no feature amounts matching the condition has been transmitted from the another car to which the request for feature amounts has been transmitted.

In step S67, in the case where the feature amounts matching the condition are transmitted from the another car to which the request for feature amounts has been transmitted, for example, the notification indicating that there are no feature amounts matching the condition is not transmitted from the another car to which the request for feature amounts has been transmitted. Therefore, the processing proceeds to step S68.

In step S68, the feature amount reception control unit 207 controls the communication unit 103 to acquire the feature amounts matching the condition and the position and posture information of the another car transmitted from the another car, and supplies the feature amounts and the acquired information to the feature amount selection unit 208.

In step S69, the feature amount selection unit 208 selects the feature amounts of the time added to the timestamp that is closest to the current time among the feature amounts matching the condition, and outputs the selected feature amounts to the feature amount combining unit 202. At this time, the feature amount selection unit 208 also supplies, to the feature amount combining unit 202, the position and posture information of the another car that has transmitted the selected feature amounts.

In step S70, the feature amount combining unit 202 combines the feature amounts matching the condition transmitted from the another car supplied from the feature amount selection unit 208 and the feature amounts of the user's car transmitted from the local feature amount calculation unit 201, and outputs the combined feature amount to the global feature amount calculation unit 203.

Furthermore, in step S67, in the case where the notification indicating that there are no feature amounts matching the condition has been transmitted from the another car to which the request for feature amounts has been transmitted, for example, the processing proceeds to step S74.

That is, in this case, since the notification that there are no feature amounts matching the condition is transmitted and the feature amounts are not transmitted, the object recognition processing is executed using only the feature amounts calculated by the local feature amount calculation unit 201 of the user's own car.

Note that, in the case where a plurality of other cars is present in the vicinity of the user's car, only the feature amounts from another car that has transmitted the feature amounts matching the condition are received and used in the object recognition processing.

By the above processing, only the feature amounts matching the condition are transmitted from the another car, and only the feature amounts matching the condition and calculated by the user's car and the another car are combined and the object recognition processing is performed. Therefore, the object recognition accuracy can be improved.

Note that, in the above description, an example in which the vehicle 51 transmits the request for feature amounts to another car together with the condition for feature amounts to be requested to the another car existing in the vicinity, and the another car that has received the request transmits the feature amounts if there are feature amounts matching the condition, or transmits the notification indicating there are no feature amounts matching the condition if there are no feature amounts matching the condition has been described.

However, in the case where another car is present in the vicinity, the vehicle 51 may request the another car in the vicinity to transmit the feature amounts, the another car that has received the request may transmit the feature amounts regardless of the condition, and the vehicle 51 that has requested the feature amounts may select and use the feature amounts matching the condition from among the received feature amounts and discard the unselected feature amounts.

4. Second Embodiment

<Second Configuration Example of Object Recognition Unit>

In the above description, an example in which the object recognition unit 181 is configured by PointNet has been described. However, another configuration may be adopted as long as a DNN structure is implemented, and for example, an object recognition unit may be configured by PointNet++.

Here, the PointNet++ refers to a neural network that receives point cloud information as input and outputs a predetermined processing result on the basis of the input point cloud information, similarly to PointNet.

Figure 8:
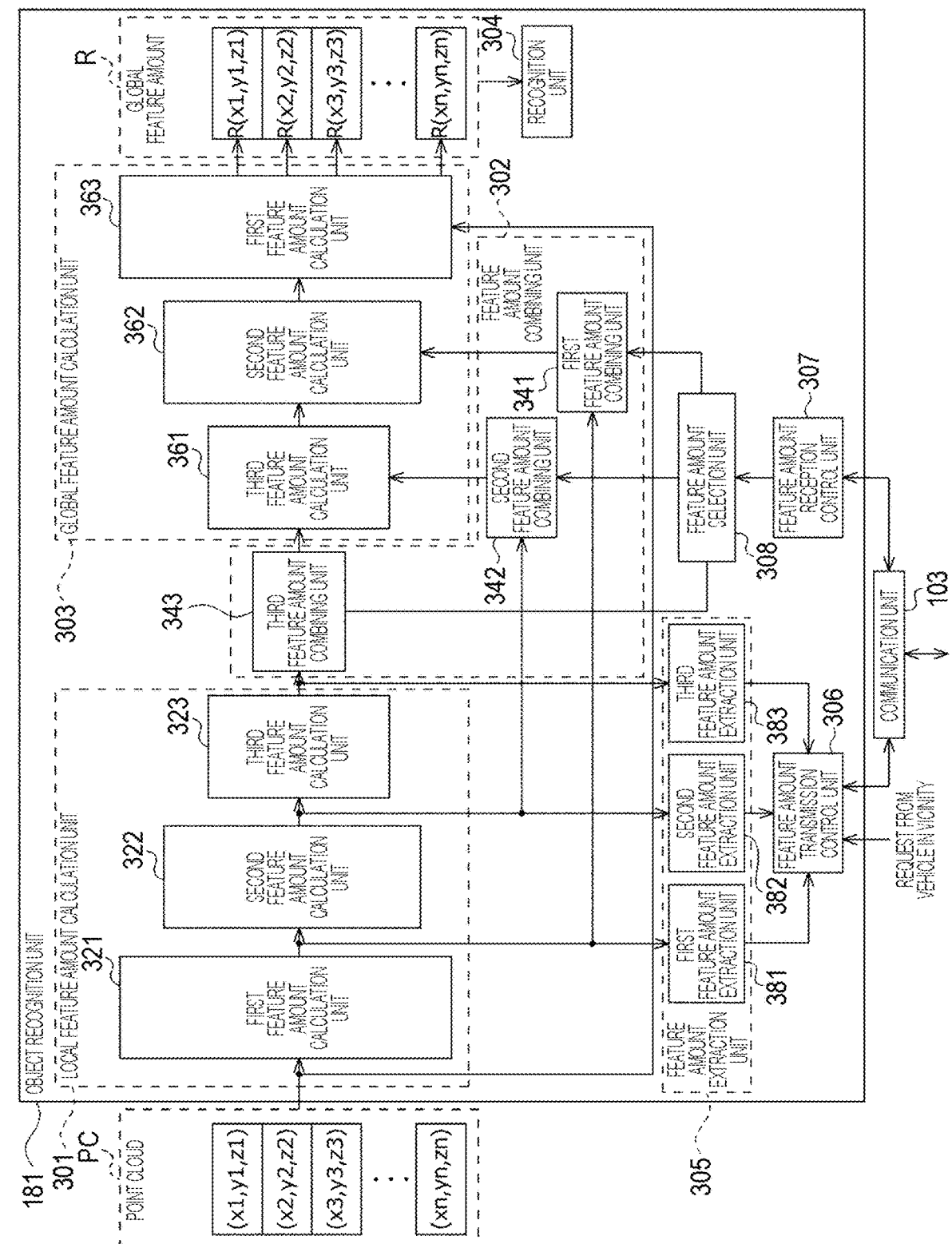
FIG. 8 is a block diagram for describing a configuration example of a second embodiment of an object recognition unit of the present disclosure.

FIG. 8 is a diagram illustrating a second configuration example of an object recognition unit 181 configured by PointNet++.

The object recognition unit 181 in FIG. 8 includes a local feature amount calculation unit 301, a feature amount combining unit 302, a global feature amount calculation unit 303, a recognition unit 304, a feature amount extraction unit 305, a feature amount transmission control unit 306, a feature amount reception control unit 307, and a feature amount selection unit 308.

The local feature amount calculation unit 301 calculates local feature amounts for each point in a point cloud PC in stages, and includes a first feature amount calculation unit 321, a second feature amount calculation unit 322, and a third feature amount calculation unit 323.

The first feature amount calculation unit 321 calculates a first feature amount that is a first-stage feature amount in units of groups each group including a plurality of points among points constituting the point cloud PC, and outputs the first feature amount to the second feature amount calculation unit 322, a first feature amount combining unit 341 of the feature amount combining unit 302, and a first feature amount extraction unit 381 of the feature amount extraction unit 305.

Note that, here, the group that is a unit in which the first feature amount is obtained by the first feature amount calculation unit 321 is referred to as a first hierarchical group.

The second feature amount calculation unit 322 calculates a second feature amount that is a second-stage feature amount in units of groups each group including a plurality of the first feature amounts among the first feature amounts obtained by the first feature amount calculation unit 321, and outputs the second feature amount to the third feature amount calculation unit 323, a second feature amount combining unit 342 of the feature amount combining unit 302, and a second feature amount extraction unit 382 of the feature amount extraction unit 305.

Note that, here, the group that is a unit in which the second feature amount is obtained by the second feature amount calculation unit 322 is referred to as a second hierarchical group.

The third feature amount calculation unit 323 calculates a third feature amount that is a third-stage feature amount in units of groups each group including a plurality of the second feature amounts among the second feature amounts obtained by the second feature amount calculation unit 322, and outputs the third feature amount to a third feature amount combining unit 343 of the feature amount combining unit 302 and a third feature amount extraction unit 383 of the feature amount extraction unit 305.

Note that, here, the group that is a unit in which the third feature amount is obtained by the third feature amount calculation unit 323 is referred to as a third hierarchical group.

The feature amount combining unit 302 combines the first feature amount, the second feature amount, and the third feature amount supplied from another car via the communication unit 103, the feature amount reception control unit 307, and the feature amount selection unit 308 with the first feature amount, the second feature amount, and the third feature amount supplied from the local feature amount calculation unit 301, respectively, and outputs combined feature amounts to the global feature amount calculation unit 303.

More specifically, the feature amount combining unit 302 includes the first feature amount combining unit 341, the second feature amount combining unit 342, and the third feature amount combining unit 343.

The first feature amount combining unit 341 combines the first feature amount supplied from the first feature amount calculation unit 321 and the first feature amount supplied the another car supplied from the feature amount selection unit 308, and outputs the combined first feature amount to a second feature amount calculation unit 362 of the global feature amount calculation unit 303.

The second feature amount combining unit 342 combines the second feature amount supplied from the second feature amount calculation unit 322 and the second feature amount supplied from the another car supplied from the feature amount selection unit 308, and outputs the combined second feature amount to a third feature amount calculation unit 361 of the global feature amount calculation unit 303.

The third feature amount combining unit 343 combines the third feature amount supplied from the third feature amount calculation unit 323 and the third feature amount supplied from the another car supplied from the feature amount selection unit 308, and outputs the combined third feature amount to a third feature amount calculation unit 361 of the global feature amount calculation unit 303.

The global feature amount calculation unit 303 calculates and outputs a global feature amount R at each point on the basis of the first feature amount, the second feature amount, and the third feature amount supplied from the feature amount combining unit 202.

More specifically, the global feature amount calculation unit 303 includes the third feature amount calculation unit 361, the second feature amount calculation unit 362, and the first feature amount calculation unit 363.

The third feature amount calculation unit 361 restores a feature amount including a point cloud in units of the second hierarchical group on the basis of the third feature amount supplied from the third feature amount combining unit 343 and the second feature amount supplied from the second feature amount combining unit 342, and outputs the restoration result to the second feature amount calculation unit 362 as a global feature amount in units of the second hierarchical group.

More specifically, the third feature amount calculation unit 361 extends the third feature amount supplied from the third feature amount combining unit 343 by using the second feature amount in units of the second hierarchical group supplied from the second feature amount combining unit 342, and restores the third feature amount as the second feature amount that is the feature amount of the point cloud in units of the second hierarchical group. Then, the third feature amount calculation unit 361 outputs the restoration result to the second feature amount calculation unit 362 as the global feature amount R in units of the second hierarchical group.

The second feature amount calculation unit 362 restores a feature amount in units of the first hierarchical group on the basis of the global feature amount R in units of the second hierarchical group supplied from the third feature amount calculation unit 361 and the first feature amount supplied from the first feature amount combining unit 341, and outputs the restoration result to the first feature amount calculation unit 363 as the global feature amount R in units of the first hierarchical group. More specifically, the second feature amount calculation unit 362 extends the second feature amount supplied from the third feature amount calculation unit 361 by using the first feature amount in units of the first hierarchical group supplied from the first feature amount combining unit 341, and restores the second feature amount as the first feature amount that is the feature amount of the point cloud in units of the first hierarchical group. Then, the second feature amount calculation unit 362 outputs the restoration result to the first feature amount calculation unit 363 as the global feature amount R in units of the first hierarchical group.

The first feature amount calculation unit 363 restores a feature amount in units of each point on the basis of the global feature amount R in units of the first hierarchical group supplied from the second feature amount calculation unit 362 and the point cloud PC, and outputs the restoration result to the recognition unit 304 as the global feature amount R of an object. The recognition unit 304 executes object recognition processing based on the global feature amount R and outputs an object recognition result.

More specifically, the first feature amount calculation unit 363 extends the first feature amount supplied from the second feature amount calculation unit 362 using the point cloud PC, and restores the first feature amount as the global feature amount R based on the feature amount of the point cloud in units of points. Then, the first feature amount calculation unit 363 outputs the restoration result to the recognition unit 304 as the global feature amount R in units of points.

That is, in the object recognition unit 181 in FIG. 8 of the present disclosure, the local feature amount calculation unit 301 and the global feature amount calculation unit 303 form the PointNet++ by DNN.

That is, the first feature amount calculation unit 321, the second feature amount calculation unit 322, and the third feature amount calculation unit 323 in the local feature amount calculation unit 301 substantially configure an input layer, a hidden layer, and an output layer in the deep neural network (DNN).

Therefore, the local feature amount calculation unit 301 in FIG. 8 is configured to obtain the feature amounts by the three-stage hierarchical structure like the first feature amount calculation unit 321 to the third feature amount calculation unit 323, but the number of hierarchies may be any number other than two or three as long as the hierarchical structure has at least two or more hierarchies corresponding to the input layer and the output layer.

Then, the local feature amount calculation unit 301 and the global feature amount calculation unit 303 have performed learning (backpropagation) using, for example, a position (x, y, z) and a color (r, g, b) that are point clouds, as inputs, and a semantic segmentation label as a correct answer.

The feature amount extraction unit 305 extracts the feature amount that is a calculation result of the local feature amount calculation unit 301 and supplies the feature amount to the feature amount transmission control unit 306.

More specifically, the feature amount extraction unit 305 includes a first feature amount extraction unit 381, a second feature amount extraction unit 382, and a third feature amount extraction unit 383.

The first feature amount extraction unit 381 extracts a first feature amount that is a calculation result of the first feature amount calculation unit 351 of the local feature amount calculation unit 301, and outputs the first feature amount to the feature amount transmission control unit 306.

The second feature amount extraction unit 382 extracts a second feature amount that is a calculation result of the second feature amount calculation unit 352 of the local feature amount calculation unit 301, and outputs the second feature amount to the feature amount transmission control unit 306.

The third feature amount extraction unit 383 extracts a third feature amount that is a calculation result of the third feature amount calculation unit 353 of the local feature amount calculation unit 301, and outputs the third feature amount to the feature amount transmission control unit 306.

When there is a request for feature amounts from another car around the user's car, the feature amount transmission control unit 306 controls the communication unit 103 to transmit the first to third feature amounts extracted by, for example, vehicle to vehicle communication or the like to the requested another car.

At this time, the feature amount transmission control unit 306 transmits each of the feature amounts with information for identifying which of the first feature amount, the second feature amount, and the third feature amount the each feature amount is.

Furthermore, the feature amount transmission control unit 306 transmits the feature amounts with information indicating a deep neural network (DNN) structure of the local feature amount calculation unit 301 of the user's car.

In a case where there are other cars in the vicinity of the user's car, the feature amount reception control unit 307 controls the communication unit 103 to request the other cars in the vicinity of the user's car to transmit the feature amounts, acquires the feature amounts transmitted from the other cars in response to the request and supplies the feature amounts to the feature amount selection unit 308.

The feature amount selection unit 308 extracts, for example, only feature amounts in a predetermined time range from the current time from among the feature amounts from the other companies present around the user's car supplied from the feature amount reception control unit 307, and outputs the feature amounts to the feature amount combining unit 302.

Furthermore, the feature amount selection unit 308 selectively extracts only the feature amount having the same DNN structure of the user's car on the basis of the information indicating the DNN structures of the other cars assigned to the respective feature amounts supplied from the other cars, and outputs the extracted feature amount to the feature amount combining unit 302.

More specifically, the feature amount selection unit 308 outputs, among the selected feature amounts, the first feature amount to the first feature amount combining unit 341 of the feature amount combining unit 302, the second feature amount to the second feature amount combining unit 342, and the third feature amount to the third feature amount combining unit 343, respectively.

The first feature amount combining unit 341, the second feature amount combining unit 342, and the third feature amount combining unit 343, of the feature amount combining unit 302, may adjust weights when combining the first feature amount, the second feature amount, and the third feature amount supplied from the feature amount selection unit 308, with the first feature amount, the second feature amount, and the third feature amount, respectively, according to a DNN structure of another car.

That is, in a case where the DNN structure of the user's car and the DNN structure of the another car are different, the feature amount combining unit 202 may reduce the weight of the feature amount of the another car and increase the weight of the feature amount of the user's car and combine the feature amounts.

Furthermore, in the case where the DNN structure of the user's car and the DNN structure of the another car are the same, the feature amount combining unit 202 sets the weight of the feature amount of the another car and the weight of the feature amount of the user's car to be the same and combines the feature amounts.

Furthermore, the first feature amount calculation unit 351, the second feature amount calculation unit 352, and the third feature amount calculation unit 353 constituting the local feature amount calculation unit 301 constitute local processing structures that respectively calculate the feature amounts for each group of the first hierarchical group, the second hierarchical group, and the third hierarchical group with respect to the points in the point cloud PC.

Moreover, the global feature amount calculation unit 303 constitutes a global processing structure that performs processing that does not affect the global feature amount R as a whole even if the order of the points is changed.

That is, the object recognition unit 181 in FIG. 8 of the present disclosure includes the above-described local processing structure that performs processing for each point and the above-described global processing structure that does not affect the processing result even if the order of the points is changed, and the PointNet++ is formed as a whole.

Then, in the object recognition unit 181 of FIG. 8 of the present disclosure, processing is performed by the global processing structure in which the feature amount is calculated by processing for each group of the first hierarchical group, the second hierarchical group, and the third hierarchical group with reference to the points in the point cloud PC by the local processing structure.

<Object Recognition Processing in Second Embodiment>

Figure 9:
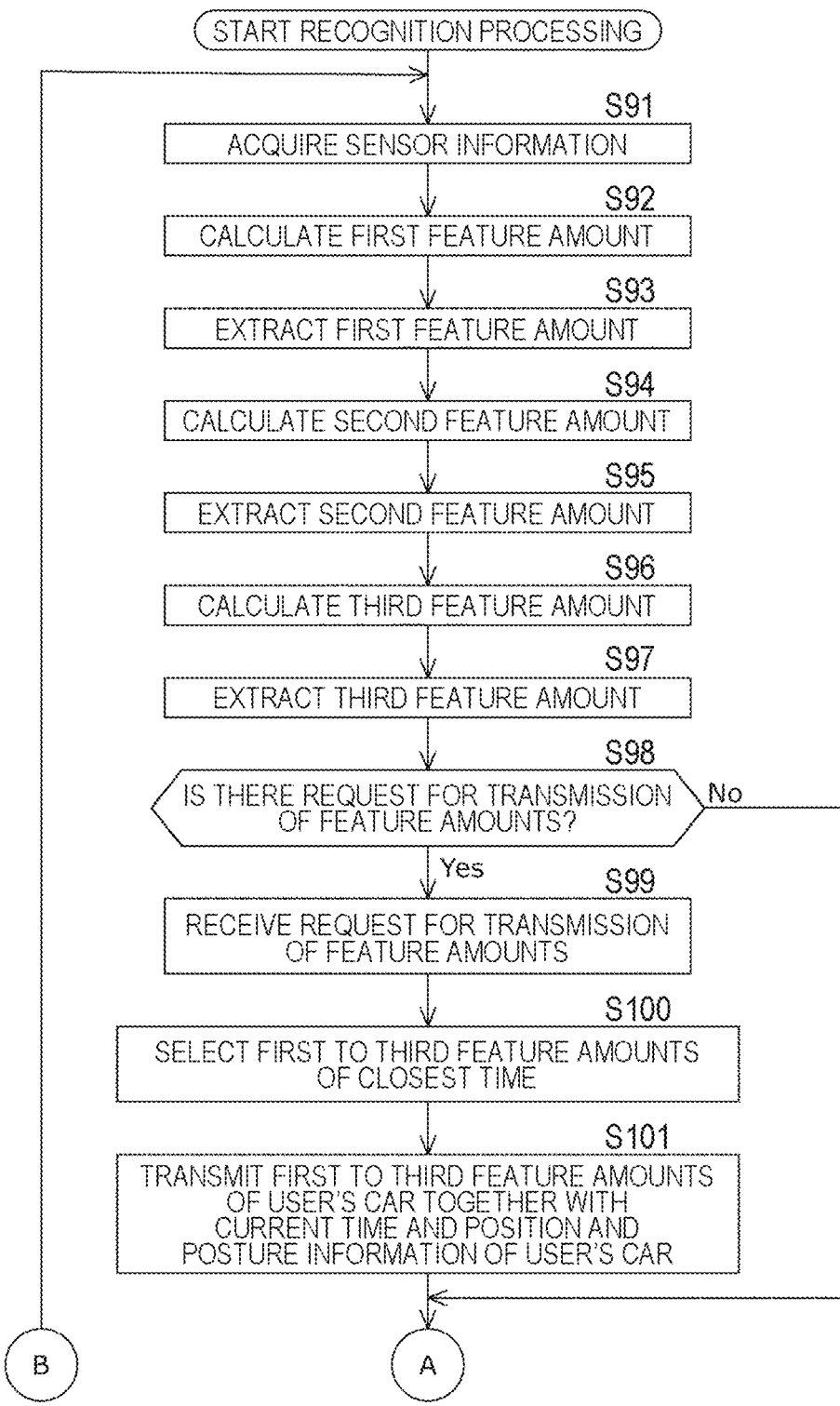
FIG. 9 is a flowchart for describing object recognition processing of the second embodiment.
Figure 10:
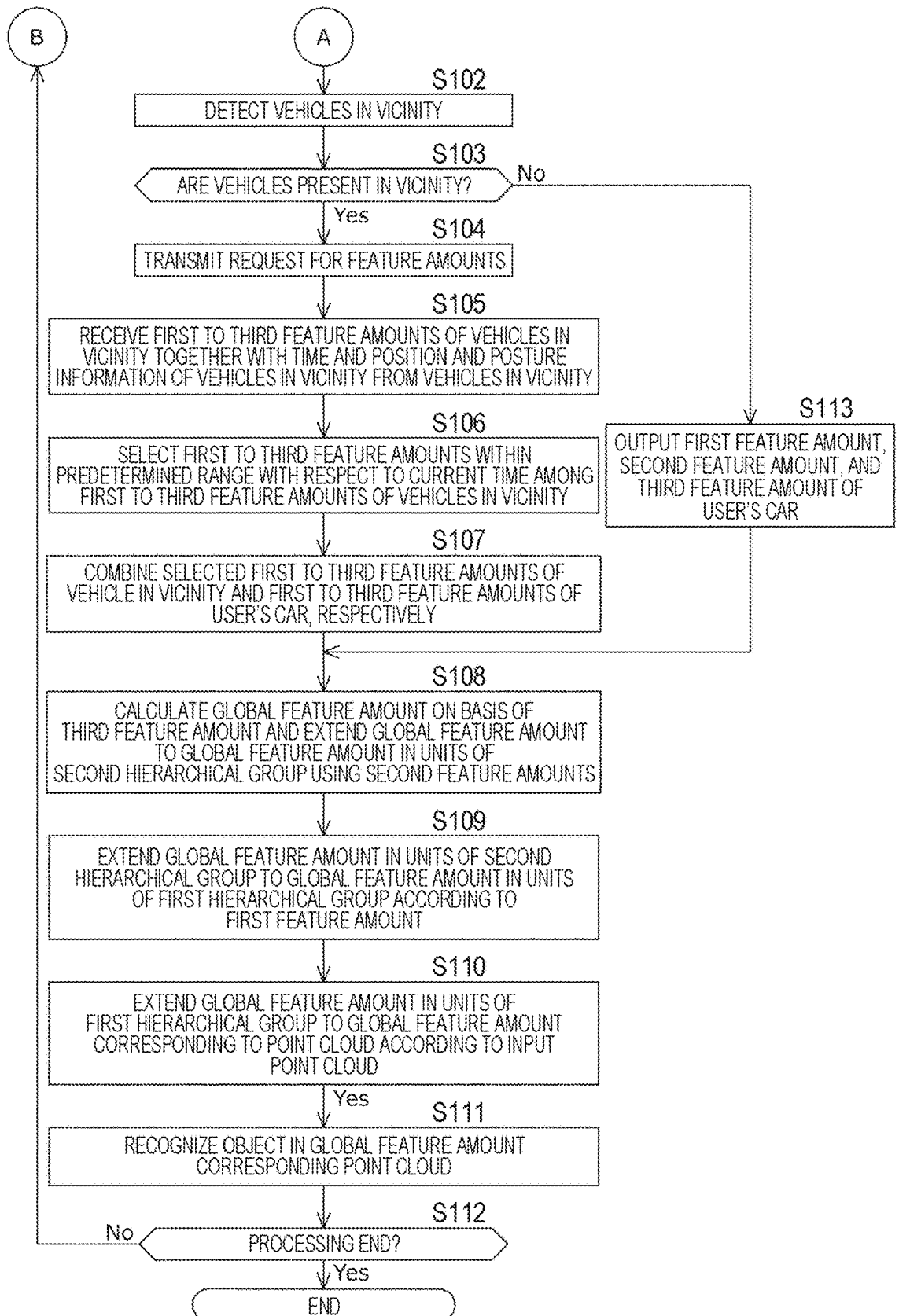
FIG. 10 is a flowchart for describing the object recognition processing of the second embodiment.

Next, the object recognition processing by the object recognition unit 181 in FIG. 8 according to the second embodiment will be described with reference to the flowcharts in FIGS. 9 and 10.

In step S91, the first feature amount calculation unit 221 of the local feature amount calculation unit 201 acquires the point cloud PC obtained by a stereo camera, LiDAR, or the like supplied from a data acquisition unit 102.

In step S92, the first feature amount calculation unit 321 calculates the first feature amount that is the feature amount in units of the first hierarchical group from the point cloud PC, and outputs the first feature amount to the second feature amount calculation unit 322, the first feature amount combining unit 341 of the feature amount combining unit 302, and the first feature amount extraction unit 381 of the feature amount extraction unit 305.

In step S93, the first feature amount extraction unit 381 extracts the first feature amount supplied from the first feature amount calculation unit 321 and outputs the first feature amount to the feature amount transmission control unit 306. As a result, the feature amount transmission control unit 306 adds a timestamp corresponding to the current time in the system clock (not illustrated) to the supplied first feature amount and stores the first feature amount.

In step S94, the second feature amount calculation unit 322 acquires the first feature amount supplied from the first feature amount calculation unit 321, calculates the second feature amount that is the feature amount in units of the second hierarchical group, from the first feature amount, and outputs the second feature amount to the third feature amount calculation unit 323, the second feature amount combining unit 342 of the feature amount combining unit 302, and the second feature amount extraction unit 382 of the feature amount extraction unit 305.

In step S95, the second feature amount extraction unit 382 of the feature amount extraction unit 305 extracts the second feature amount supplied from the second feature amount calculation unit 322 and outputs the second feature amount to the feature amount transmission control unit 306. As a result, the feature amount transmission control unit 306 adds a timestamp corresponding to the current time in the system clock (not illustrated) to the supplied second feature amount and stores the second feature amount.

In step S96, the third feature amount calculation unit 323 acquires the second feature amount supplied from the second feature amount calculation unit 322, calculates the third feature amount that is the feature amount in units of the third hierarchical group from the second feature amount, and outputs the third feature amount to the third feature amount combining unit 343 of the feature amount combining unit 302 and the third feature amount extraction unit 383 of the feature amount extraction unit 305.

In step S97, the third feature amount extraction unit 383 of the feature amount extraction unit 305 extracts the third feature amount supplied from the third feature amount calculation unit 323 and outputs the third feature amount to the feature amount transmission control unit 306. As a result, the feature amount transmission control unit 306 adds a timestamp corresponding to the current time in the system clock (not illustrated) to the supplied third feature amount and stores the third feature amount.

In step S98, the feature amount transmission control unit 306 controls the communication unit 103 to determine whether or not the request for feature amounts has been transmitted from surrounding another car.

In step S98, in a case where it is determined that the request for feature amounts has been transmitted from another car, the processing proceeds to step S99.

In step S99, the feature amount transmission control unit 306 receives the request for feature amounts transmitted from the another car.

In step S100, the feature amount transmission control unit 306 selects the first to third feature amounts of the time closest to the current time from among the stored first to third feature amounts.

In step S101, the feature amount transmission control unit 306 controls the communication unit 103 to transmit the first feature amount to the third feature amount at the time closest to the selected current time to the other vehicle that has requested the feature amount. At this time, the feature amount transmission control unit 306 transmits self-position information detected by the self-position estimation unit 132 and self-posture information together to the another car that has requested the feature amounts.

Note that, in step S98, in a case where it is determined that there is no request for transmission of the feature amounts, the processing in steps S99 to S101 is skipped, and the feature amounts are not transmitted to the another car.

In step S102 (FIG. 10), the vehicle detection unit 182 detects a vehicle approaching the user's car by communication with vehicles (other cars) around the user's car by vehicle to vehicle communication or the like.

In step S103, the feature amount reception control unit 307 determines whether or not other cars are present in the vicinity within a predetermined distance from the user's car on the basis of the detection result of the vehicle detection unit 182.

In step S103, in a case where it is determined that other cars are present in the vicinity of the user's car, the processing proceeds to step S104.

In step S104, the feature amount reception control unit 307 controls the communication unit 103 to request the other cars in the vicinity of the user's car to transmit the feature amounts.

With this processing, the request from another car is received in step S98 described above in the object recognition processing in the other cars, and thus the feature amounts are transmitted from the other cars to the user's car by the processing of steps S99 to S101.

Therefore, in step S105, the feature amount reception control unit 307 controls the communication unit 103 to acquire the feature amounts and position and posture information of the other cars transmitted from the other cars, and supplies the feature amounts and the information to the feature amount selection unit 308.

In step S106, the feature amount selection unit 308 selects the feature amounts of the time added to the timestamp that is closest to the current time among the supplied feature amounts, and outputs the selected feature amounts to the feature amount combining unit 302. At this time, the feature amount selection unit 308 also supplies, to the feature amount combining unit 302, the position and posture information of the another car that has transmitted the selected feature amounts.

More specifically, the feature amount selection unit 308 outputs the first feature amount to the first feature amount combining unit 341, outputs the second feature amount to the second feature amount combining unit 342, and outputs the third feature amount to the third feature amount combining unit 343, among the supplied feature amounts.

In step S107, the first feature amount combining unit 341 of the feature amount combining unit 302 combines the first feature amount transmitted from the another car supplied from the feature amount selection unit 308 with the first feature amount transmitted from the first feature amount calculation unit 321 of the local feature amount calculation unit 301, and outputs the combined feature amount to the second feature amount calculation unit 362 of the global feature amount calculation unit 303.

Furthermore, the second feature amount combining unit 342 and the third feature amount combining unit 343 of the feature amount combining unit 302 combine the second feature amount and the third feature amount transmitted from the another car supplied from the feature amount selection unit 308 with the second feature amount and the third feature amount transmitted from the second feature amount calculation unit 322 and the third feature amount calculation unit 323, respectively, and output the combined feature amounts to the third feature amount calculation unit 361 of the global feature amount calculation unit 303.

At this time, the first feature amount combining unit 341, the second feature amount combining unit 342, and the third feature amount combining unit 343 of the feature amount combining unit 302 set weights according to the positional relationship between the another car that has transmitted the feature amounts and the user's car and the DNN structures, and combine the first feature amounts, the second feature amounts, and the third feature amounts by the product-sum using the weights.

In step S108, the third feature amount calculation unit 361 of the global feature amount calculation unit 303 calculates the global feature amount R in units of the third hierarchical group on the basis of the third feature amount supplied from the third feature amount combining unit 343, extends the global feature amount R to the feature amount in units of the second hierarchical group according to the second feature amount supplied from the second feature amount combining unit 342, and outputs the global feature amount R as the global feature amount R in units of the second hierarchical group to the second feature amount calculation unit 362.

In step S109, the second feature amount calculation unit 362 of the global feature amount calculation unit 303 extends the global feature amount R in units of the second hierarchical group supplied from the third feature amount calculation unit 361 to the feature amount in units of the first hierarchical group according to the first feature amount supplied from the first feature amount combining unit 341, and outputs the global feature amount R as the global feature amount R in units of the first hierarchical group to the first feature amount calculation unit 363.

In step S110, the first feature amount calculation unit 363 of the global feature amount calculation unit 303 extends the global feature amount R in units of the first hierarchical group supplied from the second feature amount calculation unit 362 to the feature amount in units of points in the point cloud PC according to the point cloud PC, and outputs the global feature amount R as the global feature amount R in units of points to the recognition unit 304.

In step S111, the recognition unit 304 performs the object recognition processing for each point in the global feature amount R in units of points, and outputs an object recognition result.

In step S112, the object recognition unit 181 determines whether or not an instruction on termination of the processing has been given. In a case where the instruction on the termination has not been given, the processing returns to step S91 (FIG. 9), and the processing in step S91 and subsequent steps is repeated.

Furthermore, in step S103, in a case where it is determined that vehicles are not present in the vicinity within the predetermined distance of the user's car and no other cars are present, the processing proceeds to step S113.

In step S113, the first feature amount combining unit 341, the second feature amount combining unit 342, and the third feature amount combining unit 343 of the feature amount combining unit 302 directly output the first feature amount, the second feature amount, and the third feature amount respectively calculated by the first feature amount calculation unit 321, the second feature amount calculation unit 322, and the third feature amount calculation unit 323 of the local feature amount calculation unit 301 to the third feature amount calculation unit 361 and the second feature amount calculation unit 362 of the global feature amount calculation unit 303.

That is, the fact that there are no other cars in the vicinity of the user's car means that there is no supply of the feature amounts from the other cars. Therefore, the processing proceeds to step S112, and the object recognition processing using the first feature amount, the second feature amount, and the third feature amount by the user's car alone using only the calculated first feature amount, second feature amount, and third feature amount is performed.

According to the above series of processing, even in the object recognition unit 181 configured by the PointNet++ as illustrated in FIG. 8, in the case where another car is present in the vicinity within a predetermined distance from the user's car, the another car is requested to send the feature amounts, and the feature amounts calculated in the object recognition processing of the another car are acquired in response to the request. Then, by combining the feature amount calculated in the user's car and the acquired feature amount of the another car, the object is recognized by the collective object recognition processing in which the feature amount obtained by the another is combined.

As a result, since the feature amount is obtained by using the sensing result of the another car and the sensing result of the user's car, the object recognition processing can be implemented with the recognition accuracy corresponding to a case of using a sensing result of the entire point cloud.

Note that, even in the object recognition unit 181 of FIG. 8, similarly to the modification in the object recognition unit 181 of FIG. 3, when requesting another car to transmit feature amounts, a condition for feature amounts may be transmitted together, only the feature amounts matching the condition may be transmitted from the another car, or feature amounts may be requested without a condition and only the feature amounts matching the condition are selected from among the received feature amounts and the other unselected feature amounts may be discarded.

As for a modification in the second embodiment, similarly to the object recognition processing in the modification of the first embodiment, only a point that a condition for feature amounts is transmitted when requesting another car to transmit feature amounts, and only the feature amounts matching the condition are transmitted from the another car is different from the second embodiment, and other points are similar, so description thereof is omitted.

Furthermore, in each of the first feature amount calculation unit 321, the second feature amount calculation unit 322, and the third feature amount calculation unit 323 of the local feature amount calculation unit 301 in the object recognition unit 181 in FIG. 8, the feature amount is obtained in units of groups for each hierarchy, the information amount of the obtained feature amount becomes smaller in order of the first feature amount, the second feature amount, and the third feature amount. Therefore, in the case of acquiring the feature amounts from another car, it is possible to reduce the communication load of the vehicle to vehicle communication and implement high-speed communication by selectively transmitting and receiving the feature amount of a higher hierarchy.

That is, when requesting another car to transmit feature amounts, for example, by requesting only the second feature amount rather than requesting only the first feature amount, the information amount of the acquired feature amount can be reduced, and the communication load can be reduced and the processing related to the acquisition of the feature amounts can be speeded up.

Moreover, when requesting another car to transmit feature amounts, by requesting only the third feature amount rather than requesting only the second feature amount, the communication load can be further reduced, and the processing related to the acquisition of the feature amounts can be further speeded up.

5. Example of Executed by Software

By the way, the above-described series of processing can be executed by hardware or software. In a case where the series of processing is executed by software, a program constituting the software is installed from a recording medium into a computer incorporated in special hardware, a general-purpose computer capable of executing various functions by installing various programs, or the like.

Figure 11:
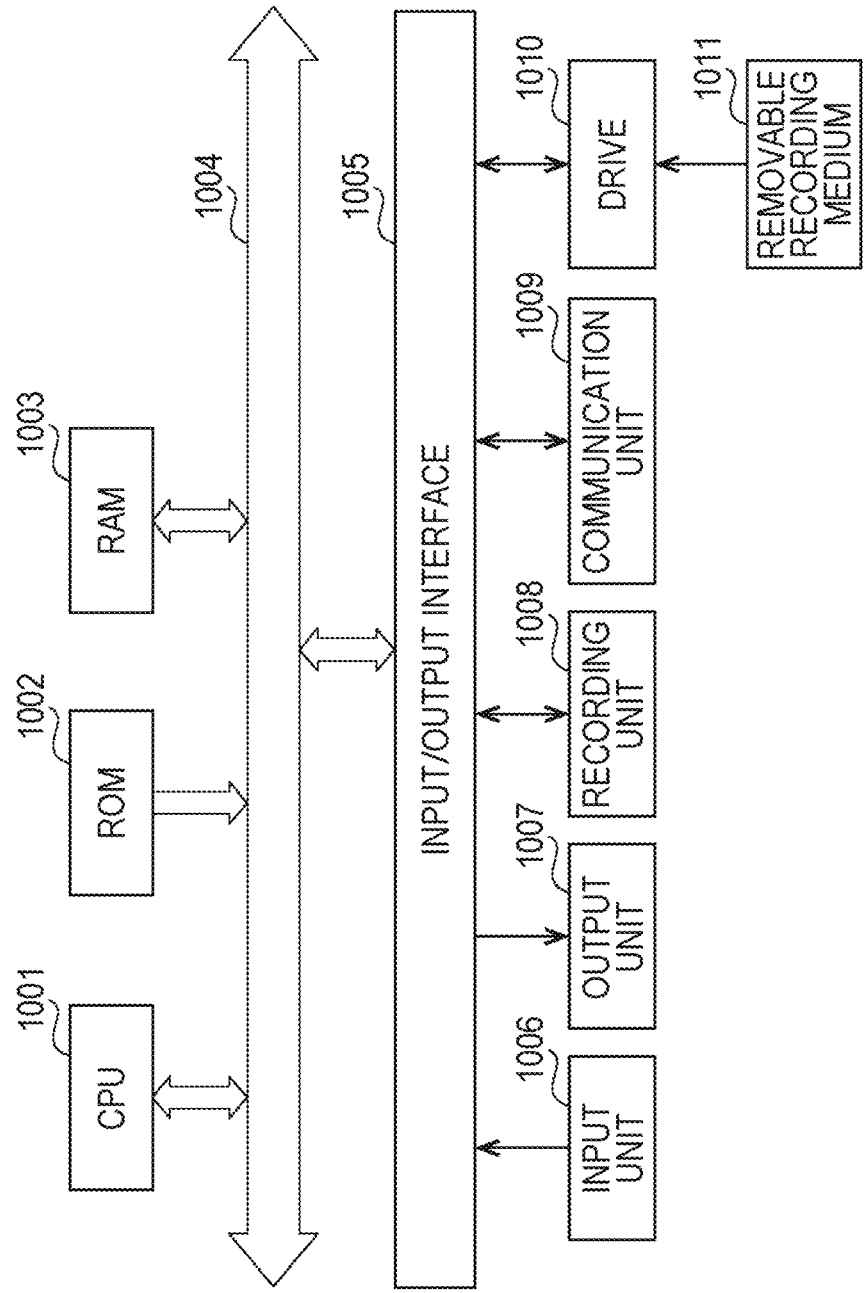
FIG. 11 is a diagram illustrating a configuration example of a general-purpose computer.

FIG. 11 illustrates a configuration example of a general-purpose computer. The personal computer incorporates a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse for a user to input operation commands, an output unit 1007 that outputs a processing operation screen and an image of a processing result to a display device, a storage unit 1008 including a hard disk drive for storing programs and various data, and a communication unit 1009 including a local area network (LAN) adapter and the like and which executes communication processing via a network typified by the Internet are connected. Furthermore, a drive 1010 that reads and writes data with respect to a removable storage medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory is connected to the input/output interface 1005.

The CPU 1001 executes various types of processing according to a program stored in the ROM 1002 or a program read from the removable storage medium 1011 such as a magnetic disk, an optical disk, a magneto-optical disk, or a semiconductor memory, installed in the storage unit 1008, and loaded from the storage unit 1008 to the RAM 1003. Furthermore, the RAM 1003 appropriately stores data and the like necessary for the CPU 1001 to execute the various types of processing.

In the computer configured as described above, the CPU 1001, for example, loads the program stored in the storage unit 1008 into the RAM 1003 and executes the program via the input/output interface 1005 and the bus 1004, whereby the above-described series of processing is performed.

The program to be executed by the computer (CPU 1001) can be recorded on the removable storage medium 1011 as a package medium or the like, for example, and provided. Furthermore, the program can be provided via a wired or wireless transmission medium such as a local area network, the Internet, or digital satellite broadcast.

In the computer, the program can be installed to the storage unit 1008 via the input/output interface 1005 by attaching the removable storage medium 1011 to the drive 1010. Furthermore, the program can be received by the communication unit 1009 via a wired or wireless transmission medium and installed in the storage unit 1008. Other than the above method, the program can be installed in the ROM 1002 or the storage unit 1008 in advance.

Note that the program executed by the computer may be a program processed in chronological order according to the order described in the present specification or may be a program executed in parallel or at necessary timing such as when a call is made.

Note that the CPU 1001 in FIG. 11 implements the function of the object recognition unit 181 in FIGS. 3 and 8.

Furthermore, in the present specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one housing are both systems.

Note that the embodiments of the present disclosure are not limited to the above-described embodiments, and various modifications can be made without departing from the gist of the present disclosure.

For example, the present disclosure can adopt a configuration of cloud computing in which one function is shared and processed in cooperation by a plurality of devices via a network.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can have the following configurations.

<1> An information processing device including:

a feature amount calculation unit configured to calculate a feature amount to be used for object recognition in stages in each of a plurality of hierarchies;

an acquisition unit configured to acquire a feature amount to be used for the object recognition calculated by another feature amount calculation unit different from the feature amount calculation unit; and a recognition unit configured to perform the object recognition on the basis of the calculated feature amount and the acquired feature amount.

<2> The information processing device according to <1>, in which
the feature amount calculation unit is provided in a mobile body, and the another feature amount calculation unit is provided in another mobile body different from the mobile body.

<3> The information processing device according to <1> or <2>, in which
the recognition unit performs the object recognition on the basis of the feature amounts of a plurality of hierarchies calculated in two or more stages by the feature amount calculation unit.

<4> The information processing device according to <1> or <2>, in which
the acquisition unit acquires feature amounts of two or more hierarchies among feature amounts of a plurality of hierarchies calculated in stages by the another feature amount calculation unit.

<5> The information processing device according to <1> or <2>, in which
the acquisition unit acquires a feature amount of a specific hierarchy among feature amounts of a plurality of hierarchies calculated by the another feature amount calculation unit.

<6> The information processing device according to <2>, in which
the acquisition unit acquires a feature amount calculated by the another feature amount calculation unit, of a hierarchy having a same neural network structure as the feature amount calculation unit, among feature amounts calculated by the another feature amount calculation unit.

<7> The information processing device according to <6>, in which,
when a distance between the mobile body and the another mobile body is within a predetermined distance, the acquisition unit requests the another mobile body to transmit the feature amount calculated by the another feature amount calculation unit, of a hierarchy having a same neural network structure as the feature amount calculation unit, and
the acquisition unit acquires the feature amount calculated by the another feature amount calculation unit, of a hierarchy having a same neural network structure as the feature amount calculation unit, among the feature amounts calculated by the another feature amount calculation unit, the feature amount being transmitted from the another mobile body in response to the request for the feature amount.

<8> The information processing device according to <7>, in which
the acquisition unit requests the another mobile body to transmit the feature amount calculated by the another feature amount calculation unit, of a hierarchy having a same neural network structure as the feature amount calculation unit, and acquires the feature amount calculated by the another feature amount calculation unit, of a hierarchy having a same neural network structure as the feature amount calculation unit, among the feature amounts calculated by the another feature amount calculation unit, the feature amount being transmitted from the another mobile body in response to the request for the feature amount.

<9> The information processing device according to <7>, in which
the acquisition unit requests the another mobile body to transmit the feature amount calculated by the another feature amount calculation unit, extracts and acquires the feature amount calculated by the another feature amount calculation unit, of a hierarchy having a same neural network structure as the feature amount calculation unit, among the feature amounts calculated by the another feature amount calculation unit, the feature amount being transmitted from the another mobile body in response to the request for the feature amount, and discards a feature amount calculated by the another feature amount calculation unit, of a hierarchy not having the same neural network structure as the feature amount calculation unit.

<10> The information processing device according to any one of <1> to <9>, further including:
a combining unit configured to combine the calculated feature amount and the acquired feature amount; and
a global feature amount calculation unit configured to calculate a global feature amount on the basis of a feature amount combined by the combining unit, in which
the recognition unit performs the object recognition on the basis of the feature amount calculated by the global feature amount calculation unit.

<11> The information processing device according to <10>, in which,
in the feature amount calculation unit and the global feature amount calculation unit,
the combining unit combines the feature amount of a final hierarchy calculated in stages by the feature amount calculation unit and the feature amount of a final hierarchy calculated in stages by the another feature amount calculation unit, and
the global feature amount calculation unit calculates the global feature amount on the basis of a feature amount obtained by combining the calculated feature amount of the final hierarchy and the acquired feature amount of the final hierarchy by the combining unit.

<12> The information processing device according to <11>, in which
the feature amount calculation unit and the global feature amount calculation unit form a PointNet structure.

<13> The information processing device according to <10>, in which,
in the feature amount calculation unit and the global feature amount calculation unit,
the combining unit combines the feature amount for each hierarchy calculated in stages by the feature amount calculation unit and the feature amount for each hierarchy calculated in stages by the another feature amount calculation unit, and
the global feature amount calculation unit calculates the global feature amount on the basis of a feature amount obtained by combining the calculated feature amount for each hierarchy and the acquired feature amount for each hierarchy by the combining unit.

<14> The information processing device according to <13>, in which
the feature amount calculation unit and the global feature amount calculation unit form a PointNet++ structure.

<15> The information processing device according to <10>, in which
the feature amount calculation unit has a local processing structure that performs local processing for each point in input information including a point cloud, and calculates the feature amount to be used for the object recognition in stages in each of the plurality of hierarchies, and the global feature amount calculation unit has a global processing structure that performs global processing that is not affected by an order of the points, and calculates the global feature amount on the basis of the feature amount calculated by the feature amount calculation unit and the acquired feature amount.

<16> An information processing method of an information processing device including
a feature amount calculation unit,
an acquisition unit, and
a recognition unit,
the information processing method including the steps of:
by the feature amount calculation unit, calculating a feature amount to be used for object recognition in stages in each of a plurality of hierarchies;
by the acquisition unit, acquiring a feature amount to be used for the object recognition calculated by another feature amount calculation unit different from the feature amount calculation unit; and
by the recognition unit, performing the object recognition on the basis of the calculated feature amount and the acquired feature amount.

<17> A program for causing a computer to function as:
a feature amount calculation unit configured to calculate a feature amount to be used for object recognition in stages in each of a plurality of hierarchies;
an acquisition unit configured to acquire a feature amount to be used for the object recognition calculated by another feature amount calculation unit different from the feature amount calculation unit; and
a recognition unit configured to perform the object recognition on the basis of the calculated feature amount and the acquired feature amount.

REFERENCE SIGNS LIST

11 Object recognition system
31, 51 Vehicle
141 Vehicle exterior information detection unit
181 Object recognition unit
182 Vehicle detection unit
201 Local feature amount calculation unit
202 Feature amount combining unit
203 Global feature amount calculation unit
204 Recognition unit
205 Feature amount extraction unit
206 Feature amount transmission control unit
207 Feature amount reception control unit
208 Feature amount selection unit
221 First feature amount calculation unit
222 Second feature amount calculation unit
223 Third feature amount calculation unit
271 Second feature amount calculation unit
272 Third feature amount calculation unit
281 First feature amount extraction unit
282 Second feature amount extraction unit
283 Third feature amount extraction unit
301 Feature amount calculation unit
302 Feature amount combining unit
303 Global feature amount calculation unit
304 Recognition unit
305 Feature amount extraction unit
306 Feature amount transmission control unit
307 Feature amount reception control unit
308 Feature amount selection unit
321 First feature amount calculation unit
322 Second feature amount calculation unit
323 Third feature amount calculation unit
361 Third feature amount calculation unit
362 Second feature amount calculation unit
363 First feature amount calculation unit
381 First feature amount extraction unit
382 Second feature amount extraction unit
383 Third feature amount extraction unit

The invention claimed is:

1. An information processing device comprising:
a processing circuit configured to:
calculate a feature amount to be used for object recognition in stages in each of a plurality of hierarchies;
acquire a feature amount to be used for the object recognition calculated by another processing circuit different from the processing circuit;
combine the calculated feature amount and the acquired feature amount to provide a combined feature amount; and
perform the object recognition on a basis of the combined feature amount, wherein
the processing circuit is provided in a mobile body, and the other processing circuit is provided in another mobile body different from the mobile body, and wherein,
when a distance between the mobile body and the other mobile body is within a predetermined distance, the processing circuit is configured to request the other mobile body to transmit the feature amount calculated by the other processing circuit, of a hierarchy having a same neural network structure as the processing circuit, and
the processing circuit is configured to acquire the feature amount calculated by the other processing circuit, of a hierarchy having a same neural network structure as the processing circuit, among feature amounts calculated by the other processing circuit, the feature amount being transmitted from the other mobile body in response to the request for the feature amount.

2. The information processing device according to claim 1, wherein
the processing circuit is configured to perform the object recognition on a basis of the feature amounts of a plurality of hierarchies calculated in two or more stages by the processing circuit.

3. The information processing device according to claim 1, wherein
the processing circuit is configured to acquire feature amounts of two or more hierarchies among feature amounts of a plurality of hierarchies calculated in stages by the other processing circuit.

4. The information processing device according to claim 1, wherein
the processing circuit is configured to acquire a feature amount of a specific hierarchy among feature amounts of a plurality of hierarchies calculated by the other processing circuit.

5. The information processing device according to claim 1, wherein
the processing circuit is configured to request the other mobile body to transmit the feature amount calculated by the other processing circuit, of a hierarchy having a same neural network structure as the processing circuit, and to acquire the feature amount calculated by the other processing circuit, of a hierarchy having a same neural network structure as the processing circuit, among the feature amounts calculated by the other processing circuit, the feature amount being transmitted from the other mobile body in response to the request for the feature amount.

6. The information processing device according to claim 1, wherein
the processing circuit is configured to request the other mobile body to transmit the feature amount calculated by the other processing circuit, to extract and acquire the feature amount calculated by the other processing circuit, of a hierarchy having a same neural network structure as the processing circuit, among the feature amounts calculated by the other processing circuit, the feature amount being transmitted from the other mobile body in response to the request for the feature amount, and to discard a feature amount calculated by the other processing circuit, of a hierarchy not having the same neural network structure as the processing circuit.

7. The information processing device according to claim 1, wherein the processing circuit is further configured to:
calculate a global feature amount on a basis of the combined feature amount and
to perform the object recognition on a basis of the global feature amount.

8. The information processing device according to claim 7, wherein,
the processing circuit is configured to combine the feature amount of a final hierarchy calculated in stages by the processing circuit and the feature amount of a final hierarchy calculated in stages by the other processing circuit, and
to calculate the global feature amount on a basis of a feature amount obtained by combining the calculated feature amount of the final hierarchy and the acquired feature amount of the final hierarchy.

9. The information processing device according to claim 8, wherein the processing circuit forms a PointNet structure.

10. The information processing device according to claim 7, wherein,
the processing circuit is configured to combine the feature amount for each hierarchy calculated in stages by the processing circuit and the feature amount for each hierarchy calculated in stages by the other processing circuit, and
to calculate the global feature amount on a basis of a feature amount obtained by combining the calculated feature amount for each hierarchy and the acquired feature amount for each hierarchy.

11. The information processing device according to claim 10, wherein
the processing circuit forms a PointNet++structure.

12. The information processing device according to claim 7, wherein
the processing circuit has a local processing structure that performs local processing for each point in input information including a point cloud, and calculates the feature amount to be used for the object recognition in stages in each of the plurality of hierarchies, and
the processing circuit has a global processing structure that performs global processing that is not affected by an order of the points, and calculates the global feature amount on a basis of the calculated feature amount and the acquired feature amount.

13. An information processing method executed by an information processing device including a processing circuit, the information processing method comprising:
calculating a feature amount to be used for object recognition in stages in each of a plurality of hierarchies;
acquiring a feature amount to be used for the object recognition calculated by another processing circuit different from the processing circuit;
combining the calculated feature amount and the acquired feature amount to provide a combined feature amount; and
performing the object recognition on a basis of the combined feature amount, wherein
the processing circuit is provided in a mobile body, and the other processing circuit is provided in another mobile body different from the mobile body, and wherein,
when a distance between the mobile body and the other mobile body is within a predetermined distance, the processing circuit requests the other mobile body to transmit the feature amount calculated by the other processing circuit, of a hierarchy having a same neural network structure as the processing circuit, and
the processing circuit acquires the feature amount calculated by the other processing circuit, of a hierarchy having a same neural network structure as the processing circuit, among feature amounts calculated by the other processing circuit, the feature amount being transmitted from the other mobile body in response to the request for the feature amount.

14. A non-transitory computer readable medium storing instructions that, when executed by a processing circuit, perform an information processing method comprising:
calculating a feature amount to be used for object recognition in stages in each of a plurality of hierarchies;
acquiring a feature amount to be used for the object recognition calculated by another processing circuit different from the processing circuit;
combining the calculated feature amount and the acquired feature amount to provide a combined feature amount; and
performing the object recognition on a basis of the combined feature amount, wherein
the processing circuit is provided in a mobile body, and the other processing circuit is provided in another mobile body different from the mobile body, and wherein,
when a distance between the mobile body and the other mobile body is within a predetermined distance, the processing circuit requests the other mobile body to transmit the feature amount calculated by the other processing circuit, of a hierarchy having a same neural network structure as the processing circuit, and
the processing circuit acquires the feature amount calculated by the other processing circuit, of a hierarchy having a same neural network structure as the processing circuit, among feature amounts calculated by the other processing circuit, the feature amount being transmitted from the other mobile body in response to the request for the feature amount.

* * * * *